(12) United States Patent
Drzal et al.

(10) Patent No.: US 8,017,228 B2
(45) Date of Patent: *Sep. 13, 2011

(54) CONDUCTIVE COMPOSITE COMPOSITIONS WITH FILLERS

(75) Inventors: Lawrence T. Drzal, Okemos, MI (US); Wanjun Liu, East Lansing, MI (US); Hiroyuki Fukushima, Lansing, MI (US); InHwan Do, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 972 days.

This patent is subject to a terminal disclaimer.

(21) Appl. No.: 11/897,692

(22) Filed: Aug. 31, 2007

(65) Prior Publication Data

US 2008/0118736 A1    May 22, 2008

Related U.S. Application Data

(63) Continuation-in-part of application No. 11/801,261, filed on May 9, 2007.

(60) Provisional application No. 60/800,604, filed on May 16, 2006.

(51) Int. Cl.
| | |
|---|---|
| B32B 27/04 | (2006.01) |
| B32B 9/00 | (2006.01) |
| B05D 5/12 | (2006.01) |
| B05D 1/00 | (2006.01) |
| B05D 7/00 | (2006.01) |

(52) U.S. Cl. ............... 428/297.4; 428/368; 428/403; 427/323; 427/475; 427/122; 427/215; 427/485

(58) Field of Classification Search .......... None
See application file for complete search history.

(56) References Cited

U.S. PATENT DOCUMENTS

| | | |
|---|---|---|
| 1,137,373 A | 4/1915 | Aylsworth |
| 1,191,383 A | 7/1916 | Aylsworth |
| 3,247,020 A | 4/1966 | Shulver et al. |
| 3,404,061 A | 10/1968 | Shane et al. |
| 3,485,658 A | 12/1969 | Iler |
| 4,091,083 A | 5/1978 | Hirschvogel et al. |
| 4,239,808 A | 12/1980 | Arnason |
| 4,244,934 A | 1/1981 | Kondo |
| 4,316,930 A | 2/1982 | Stengle, Jr. |
| 4,383,942 A | 5/1983 | Davenport |
| 4,530,949 A | 7/1985 | Atkinson |
| 4,660,771 A | 4/1987 | Chabert |
| 4,689,098 A | 8/1987 | Gaughan |
| 4,704,231 A | 11/1987 | Chung |
| 4,777,336 A | 10/1988 | Asmussen |
| 4,816,331 A | 3/1989 | Rau et al. |

(Continued)

OTHER PUBLICATIONS

International Preliminary Report on Patentability for PCT/US2008/009829 dated Mar. 2, 2010.

(Continued)

*Primary Examiner* — Angela Ortiz
*Assistant Examiner* — Camie S Thompson
(74) *Attorney, Agent, or Firm* — Dickinson Wright PLLC

(57) ABSTRACT

Composite materials with a polymer matrix, low resistivity graphite coated fillers having exfoliated and pulverized graphite platelets coated on an outer surface of high resistivity fillers, are provided. The fillers can be fibers or particles. The composite materials incorporating the graphite coated fillers as reinforcements can be electrostatically painted without using a conductive primer on the polymer matrix.

49 Claims, 34 Drawing Sheets

U.S. PATENT DOCUMENTS

| | | | |
|---|---|---|---|
| 4,888,242 A | 12/1989 | Matsuo | |
| 4,915,925 A | 4/1990 | Chung | |
| 4,946,892 A | 8/1990 | Chung | |
| 4,961,988 A | 10/1990 | Zhu | |
| 4,987,175 A | 1/1991 | Bunnell | |
| 5,008,506 A | 4/1991 | Asmussen | |
| 5,019,446 A | 5/1991 | Bunnell | |
| 5,042,111 A | 8/1991 | Iyer | |
| 5,042,122 A | 8/1991 | Iyer | |
| 5,098,771 A | 3/1992 | Friend | |
| 5,102,690 A | 4/1992 | Iyer | |
| 5,123,373 A | 6/1992 | Iyer | |
| 5,138,199 A | 8/1992 | Hirata | |
| 5,149,518 A | 9/1992 | Mercuri | |
| 5,186,919 A | 2/1993 | Bunnell | |
| 5,188,783 A | 2/1993 | Pierce | |
| 5,294,300 A | 3/1994 | Kusuyama | |
| 5,310,582 A | 5/1994 | Vyakarnam | |
| 5,330,680 A | 7/1994 | Sakawaki | |
| 5,344,726 A | 9/1994 | Tanaka | |
| 5,429,652 A | 7/1995 | Sano et al. | |
| 5,439,627 A | 8/1995 | DeJager | |
| 5,522,127 A | 6/1996 | Ozaki | |
| 5,582,781 A | 12/1996 | Haywood | |
| 5,582,811 A | 12/1996 | Greinke | |
| 5,591,547 A | 1/1997 | Yoneda | |
| 5,660,923 A | 8/1997 | Bieler | |
| 5,672,446 A | 9/1997 | Barker | |
| 5,756,062 A | 5/1998 | Greinke | |
| 5,770,143 A | 6/1998 | Hawley | |
| 5,846,459 A | 12/1998 | Mercuri | |
| 5,884,217 A | 3/1999 | Koyanagi | |
| 5,885,728 A | 3/1999 | Mercuri | |
| 5,891,249 A | 4/1999 | Bieler | |
| 5,981,072 A | 11/1999 | Mercuri | |
| 6,001,207 A | 12/1999 | Enlow | |
| 6,001,919 A | 12/1999 | Yen | |
| 6,060,189 A | 5/2000 | Mercuri | |
| 6,136,474 A | 10/2000 | Kihira | |
| 6,143,218 A | 11/2000 | Mercuri | |
| 6,149,972 A | 11/2000 | Greinke | |
| 6,287,694 B1 | 9/2001 | Zaleski | |
| 6,306,264 B1 | 10/2001 | Kwon | |
| 6,395,199 B1 * | 5/2002 | Krassowski et al. | 427/470 |
| 6,455,110 B1 | 9/2002 | Fortuyn | |
| 6,508,906 B1 | 1/2003 | Bradish | |
| 6,620,463 B2 | 9/2003 | Stay | |
| 6,659,367 B2 | 12/2003 | Ballu | |
| 6,692,869 B1 | 2/2004 | Ohmura et al. | |
| 6,776,362 B2 | 8/2004 | Kawamoto | |
| 6,814,891 B1 | 11/2004 | Rex | |
| 6,872,294 B2 | 3/2005 | Lee | |
| 6,875,471 B2 | 4/2005 | Lee | |
| 6,901,986 B2 | 6/2005 | Bradish | |
| 7,026,043 B2 | 4/2006 | Jander | |
| 7,105,108 B2 | 9/2006 | Kaschak et al. | |
| 7,132,062 B1 | 11/2006 | Howard | |
| 7,320,947 B2 | 1/2008 | Child et al. | |
| 7,435,395 B2 | 10/2008 | Durkot et al. | |
| 2004/0127621 A1 | 7/2004 | Drzal | |
| 2006/0148966 A1 | 7/2006 | Drzal et al. | |
| 2006/0231792 A1 | 10/2006 | Drzal et al. | |
| 2007/0054121 A1 | 3/2007 | Weintritt | |
| 2007/0092432 A1 | 4/2007 | Prud'Homme et al. | |
| 2007/0125988 A1 * | 6/2007 | Howard | 252/500 |
| 2007/0158618 A1 | 7/2007 | Song et al. | |
| 2008/0213498 A1 | 9/2008 | Drzal et al. | |
| 2008/0280031 A1 | 11/2008 | Drzal et al. | |
| 2009/0311436 A1 * | 12/2009 | Drzal et al. | 427/485 |

OTHER PUBLICATIONS

International Preliminary Report on Patentability for PCT/US2008/009899 dated Mar. 2, 2010.

Kalaitzidou, K. et al., "A new compounding method for exfoliated graphite-polypropylene nanocomposites with enhanced flexural properties and lower percolation threshold", Composites Science and Technology 67 (2007) 2045-2051.

Giannelis, E.P., Appl. Organometallic Chem., vol. 12, pp. 675 (1998).

Pan, Y. X., et al., J. Polym. Sci., Part B: Polym. Phy., vol. 38, pp. 1626 (2000).

Chen, G. H., et al., J. Appl. Polym. Sci. vol. 82, pp. 2506 (2001).

* cited by examiner

A=Raw glass fiber
B=0.2% xGnP PDAC/PSSS coated glass fiber
C=0.2% xGnP PSSS/PDAC coated glass fiber
D=0.2% xGnP SDBS coated glass fiber
E=0.2% xGnP PDAC coated glass fiber
F=0.2% xGnP PSSS coated glass fiber FIG. 8 0.2% xGnP/PSSS coated glass fiber 0.2% xGnP/PSSS and 0.2% xGnP/PDAC coated glass fiber (3 cycles)

A=Raw glass fiber
B=1% xGnP SDBS coated glass fiber
C=1% xGnP PSSS coated glass fiber
D=1% xGnP PDAC coated glass fiber
E=1% xGnP PDAC/PSSS coated glass fiber (3 cycles)
F=1% xGnP PSSS/PDAC coated glass fiber (3 cycles)

A = Raw glass fiber
B = 1% xGnP SDBS coated glass fiber
C = 1% xGnP PSSS coated glass fiber
D = 1% xGnP PDAC coated glass fiber
E = 1% xGnP PDAC/PSSS coated glass fiber (3 cycles)
F = 1% xGnP PSSS/PDAC coated glass fiber (3 cycles)

FIG. 14  1% xGnP/PSSS coated glass fiber

1% xGnP/PDAC coated glass fiber

1% xGnP/PDAC coated glass fiber

A=Raw glass fiber
B=1% xGnP PSSS coated glass fiber
C=1% xGnP PDAC/PSSS coated glass fiber 1 cycles
D=1% xGnP PDAC/PSSS coated glass fiber 3 cycles
E=1% xGnP PDAC/PSSS coated glass fiber 5 cycles
F=1% xGnP PDAC coated glass fiber
G=1% xGnP PSSS/PDAC coated glass fiber 1 cycles
H=1% xGnP PSSS/PDAC coated glass fiber 3 cycles
I=1% xGnP PSSS/PDAC coated glass fiber 5 cycles

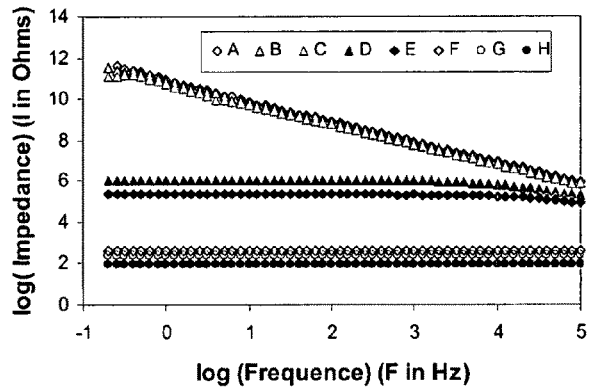

A= 28%(glass fiber) + 47% (CaCO$_3$) + 23%(UPE)= composite (xGnP™ 0%)
B= 28% (glass fiber /0.8% xGnP™-1) + 47% (CaCO$_3$) +23%(UPE)= composite (xGnP™ 0.2%)
C= 28% (glass fiber /1.0% xGnP™-1) + 47% (CaCO$_3$) +23%(UPE)= composite (xGnP™ 0.3%)
D= 28% (glass fiber) + 47% (CaCO$_3$/2.1% xGnP™-1) +23%(UPE)= composite (xGnP™ 1.0%)
E= 28% (glass fiber) + 47% (CaCO$_3$/3.2% xGnP™-1) +23%(UPE)= composite (xGnP™ 1.5%)
F= 28% (glass fiber) + 47% (CaCO$_3$/4.3% xGnP™-1) +23%(UPE)= composite (xGnP™ 2.0%)
G= 28% (glass fiber) + 47% (CaCO$_3$/7% xGnP™-1) +23%(UPE)= composite (xGnP™ 3.3%)
H= 28% (glass fiber) + 38% (CaCO$_3$/10% xGnP™-1) +29%(UPE)= composite (xGnP™ 3.8%)

Figure 30

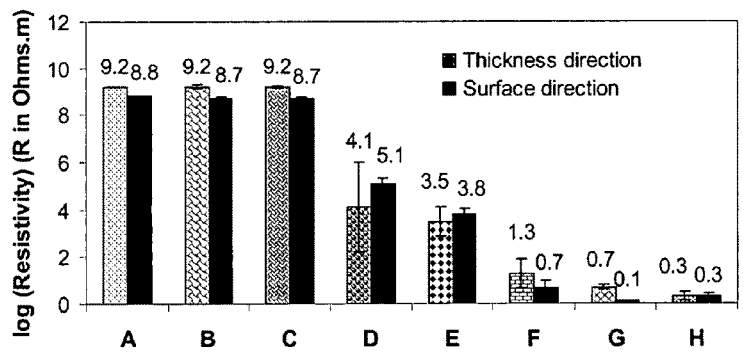

A= 28%(glass fiber) + 47% (CaCO$_3$) + 23%(UPE)= composite (xGnP™ 0%)
B= 28% (glass fiber /0.8% xGnP™-1) + 47% (CaCO$_3$) +23%(UPE)= composite (xGnP™ 0.2%)
C= 28% (glass fiber /1.0% xGnP™-1) + 47% (CaCO$_3$) +23%(UPE)= composite (xGnP™ 0.3%)
D= 28% (glass fiber) + 47% (CaCO$_3$/2.1% xGnP™-1) +23%(UPE)= composite (xGnP™ 1.0%)
E= 28% (glass fiber) + 47% (CaCO$_3$/3.2% xGnP™-1) +23%(UPE)= composite (xGnP™ 1.5%)
F= 28% (glass fiber) + 47% (CaCO$_3$/4.3% xGnP™-1) +23%(UPE)= composite (xGnP™ 2.0%)
G= 28% (glass fiber) + 47% (CaCO$_3$/7% xGnP™-1) +23%(UPE)= composite (xGnP™ 3.3%)
H= 28% (glass fiber) + 38% (CaCO$_3$/10% xGnP™-1) +29%(UPE)= composite (xGnP™ 3.8%)

Figure 31

A= 28%(glass fiber) + 47% (CaCO$_3$) + 23%(UPE)= composite (xGnP™ 0%)
B= 28% (glass fiber /1.0% xGnP™-1) + 47% (CaCO$_3$) +23%(UPE)= composite (xGnP™ 0.3%)
C= 28% (glass fiber) + 47% (CaCO$_3$/2.1% xGnP™-1) +23%(UPE)= composite (xGnP™ 1.0%)
D= 28% (glass fiber) + 47% (CaCO$_3$/3.2% xGnP™-1) +23%(UPE)= composite (xGnP™ 1.5%)
E= 28% (glass fiber) + 47% (CaCO$_3$/4.3% xGnP™-1) +23%(UPE)= composite (xGnP™ 2.0%)
F= 28% (glass fiber) + 38% (CaCO$_3$/10% xGnP™-1) +29%(UPE)= composite (xGnP™ 3.8%)

CONDUCTIVE COMPOSITE COMPOSITIONS WITH FILLERS

CROSS-REFERENCE TO RELATED APPLICATIONS

This application is a continuation-in-part of U.S. patent application Ser. No. 11/801,261, filed May 9, 2007, which claims priority to U.S. Provisional Application No. 60/800,604, filed May 16, 2006, each of which are incorporated herein by reference in their entirety.

STATEMENT REGARDING FEDERALLY SPONSORED RESEARCH OR DEVELOPMENT

Not applicable.

STATEMENT REGARDING GOVERNMENT RIGHTS

Not Applicable.

BACKGROUND OF THE INVENTION (1) Field of the Invention

The present invention relates to conductive composite materials. More specifically, the present invention relates to high resistivity filler (fiber and/or particle) reinforcements coated with exfoliated graphite particles that are incorporated into the polymer matrix of composite materials to lower resistivity. The exfoliated graphite coating of the fibers and/or particles improves the electrical properties of the resulting composite materials.

(2) Description of Related Art

Nanocomposites composed of polymer matrices with reinforcements of less than 100 nm in size, are being considered for applications such as interior and exterior accessories for automobiles, structural components for portable electronic devices, and films for food packaging (Giannelis, E. P., Appl. Organometallic Chem., Vol. 12, pp. 675 (1998); and Pinnavaia, T. J. et al., Polymer Clay Nanocomposites. John Wiley & Sons, Chichester, England (2000)). While most nanocomposite research has focused on exfoliated clay platelets, the same nanoreinforcement concept can be applied to another layered material, graphite, to produce nanoplatelets and nanocomposites (Pan, Y. X., et al., J. Polym. Sci., Part B: Polym. Phy., Vol. 38, pp. 1626 (2000); and Chen, G. H., et al., J. Appl. Polym. Sci. Vol. 82, pp. 2506 (2001)). Graphite is the stiffest material found in nature (Young's Modulus=1060 MPa), having a modulus several times that of clay, but also with excellent electrical and thermal conductivity. With the appropriate surface treatment, exfoliation and dispersion in a thermoset or thermoplastic polymer matrix results in a composite with excellent mechanical, electrical and thermal properties, opening up many new structural applications as well as non-structural ones where electromagnetic shielding and high thermal conductivity are requirements as well. Furthermore, the economics of producing nanographite platelets indicate a cost of $5 per pound appear to be attainable.

Graphite is a well known material occurring in natural and synthetic form and is well described in the literature. Illustrative of this art is a monograph by Michel A. Boucher, Canadian Minerals Yearbook 24.1-24.9 (1994). A useful form of graphite is expanded graphite which has been known for years. The first patents related to this topic appeared as early as 1910 (U.S. Pat. Nos. 1,137,373 and 1,191,383). Since then, numerous patents related to the methods and resulting expanded graphites have been issued. For example, many patents have been issued related to the expansion process (U.S. Pat. Nos. 4,915,925 and 6,149,972), expanded graphite-polymer composites (U.S. Pat. Nos. 4,530,949, 4,704,231, 4,946,892, 5,582,781, 4,091,083 and 5,846,459), flexible graphite sheet and its fabrication process by compressing expanded graphite (U.S. Pat. Nos. 3,404,061, 4,244,934, 4,888,242, 4,961,988, 5,149,518, 5,294,300, 5,582,811, 5,981,072 and 6,143,218), and flexible graphite sheet for fuel cell elements (U.S. Pat. Nos. 5,885,728 and 6,060,189). Also there are patents relating to grinding/pulverization methods for expanded graphite to produce fine graphite flakes (U.S. Pat. Nos. 6,287,694, 5,330,680 and 5,186,919). All of these patents use a heat treatment, typically in the range of 600° C. to 1200° C., as the expansion method for graphite. The heating by direct application of heat generally requires a significant amount of energy, especially in the case of large-scale production. Radiofrequency (RF) or microwave expansion methods can heat more material in less time at lower cost. U.S. Pat. No. 6,306,264 to Kwon et al. discusses microwave as one of the expansion methods for $SO_3$ intercalated graphite in a solution.

U.S. Pat. Nos. 5,019,446 and 4,987,175 describe graphite flake reinforced polymer composites and the fabrication method. These patents did not specify the methods to produce thin, small graphite flakes. The thickness (less than 100 nm) and aspect ratio (more than 100) of the graphite reinforcement is described.

Graphite, a layered material, is the stiffest material found in nature (Young's Modulus=1060 GPa), having a modulus several times that of clay, but also having excellent electrical and thermal conductivity. As discussed herewith, commonly owned patent applications describe a process using RF or microwave energy to produce exfoliated graphite nanoplatelets (xGnP) which when added to polymers can produce nanocomposites with superior mechanical properties and other desirable properties (e.g. electrical conductivity, thermal conductivity, low permeability, scratch resistance, reduced flammability, etc.) that enhance the use of polymer composites for structural applications such as interior and exterior accessories for automobiles, structural components for portable electrical devices, and non-structural applications where electromagnetic shielding and high thermal conductivity are requirements as well. There is a need to improve this process and composite produced.

Sheet molding compound (SMC) is a composite material currently used in the largest quantities in automotive applications. This composite material is composed of fiberglass-reinforced thermo-set resin made of 3 basic components: the base resin system (polyester, vinylester, epoxy, phenolic or polyimide), the reinforcements (fiberglass, graphite, aramid), and additives that include inert fillers, pigments, UV stabilizers, catalysts, inhibitors, and thickeners. The SCM is not a conductive material and requires extensive surface preparation and the application of a conductive primer prior to painting. Furthermore, its use would be greatly expanded to electromagnetic and radiofrequency shielding applications, if the SMC was electrically conductive.

Fiber reinforced polymer composites have broader application areas due to its higher strength and stiffness. Sheet molding compounding is an industry widely recognized processing method for make composite panel. Generally, two characteristics of molded SMC parts need to be improved, surface finish and conductivity. Conductive SMC can be produced by replacing non conductive fibers with more expensive conductive fibers, addition of large amounts of conductive fillers, of applying a conductive primer before painting.

Normally, conductive fillers such as carbon black, carbon fiber, metal whiskers or metal oxide and conductive polymers are dispersed in the SMC resin. U.S. Pat. No. 5,188,783 discloses a method of making a material formed from an ion-conductive polymer and a generally non-ion-conductive polymer. U.S. Pat. No. 4,689,098 discloses a method to prepare a fiber mat reinforced polyphenylene sulfide composite for EMI shielding produced from a thermoformable stampable sheet by distributing nonwoven metal whiskers or fibers of a ductile conductive metal or metal alloy carried-on the mat. U.S. Pat. No. 4,383,942 describes the method of using metal such as aluminum coated glass, metal ribbon and carbon to form conductive thermoset or thermoplastic composite materials. U.S. Pat. Nos. 6,001,919 and 6,814,891 use conductive carbon black to prepare conductive sheet molding compound and finally form a conductive composite part for electrostatic painting. U.S. Pat. Nos. 6,508,906 and 6,901,986 use chopped carbon fiber to prepare conductive sheet molding compound to obtain conductive laminate for further electrostatic painting. In addition, U.S. Pat. No. 7,026,043 invents a method of a combination of chopped fiber and filamentized fiber layer to get resin impregnated filamentized fiber layer as a molded part with improved surface characteristics. It is also mentioned that the resin impregnated filamentized fiber layer may contain a conductive filamentized fiber such that the surface of a sheet molding compound may be conductive and be capable of being electrostatically sprayed.

Conductive compositions can also be formed during compression molding by adding a conductive coating composition onto the surface of composite. U.S. Pat. No. 4,239,808 describes an in-mold coating of sheet molding compound by injecting a coating composition that may include conductive filler, vinyl ester resin, polyepoxide resin with an unsaturated monocarboxylic acid to the SMC cured parts during compression molding to get a smooth surface, fill porosity and other voids and to eliminate or reduce sink marks. U.S. Pat. Nos. 6,872,294 and 6,875,471 use a metallization method to deposit zinc or a zinc alloy onto the polymer composite surface for the purpose of further painting. U.S. Pat. No. 6,001,207 invents a complex method to use a conductive primer including polyester resin containing a fine particulate conductive material such as carbon black to coat and bond to an underlying plastic substrate panel for electrostatic spray painting of the finished contoured panel. U.S. Pat. No. 5,098,771 discloses a method to prepare an electrically conductive composite in a form suitable for applying to the surface of a substrate that includes a polymeric binder into which carbon fibrils are incorporated.

Many patents have been issued related to anode materials for lithium-ion or lithium-polymer batteries (U.S. Pat. Nos. 5,344,726, 5,522,127, 5,591,547, 5,672,446, 5,756,062, and 6,136,474). Among these materials, one of the most widely investigated and used is graphite flakes with appropriate size, typically 2 to 50 µm, with less oxygen-containing functional groups at the edges. Most of the patents described graphite flakes made by carbonization of precursor material, such as petroleum coke or coal-tar pitch, followed by graphitization process.

U.S. Pat. Nos. 4,777,336 to Asmussen et al., 5,008,506 to Asmussen, 5,770,143 to Hawley et al., and 5,884,217 to Hawley et al. describe various microwave or radiofrequency wave systems for heating a material. These applications and patents provide a background technology for the novel graphite exfoliating process preferred for the present invention.

SUMMARY OF THE INVENTION

The present invention relates to a reinforced composite material which comprises: polymeric matrix in admixture with a plurality of graphite coated fibers mixed in the polymeric matrix, the fiber having a high resistivity and having an outer surface, and exfoliated and pulverized platelets of the graphite having a particle size between about 0.1 and 500 microns coated on the outer surface of the fiber; and high resistivity particles coated with the graphite platelets in the polymeric matrix, wherein the reinforced composite material enables electrostatic painting. In further embodiments, the fibers comprise glass fibers. In still further embodiments, the weight fraction of the platelets on the outer surface of the glass fibers is from about 0.01 wt % to about 15 wt % of the weight of the fibers and on the outer surface of the particles is from about 0.05 to 20% of the weight of the particles. In further still embodiments, the fibers comprise polymer fibers. In still further embodiments, the polymeric matrix comprises a thermoset or thermoplastic organic polymer. In further still embodiments, the particles are calcium carbonate particles. In further embodiments, the fibers are as a bundle of fibers. In further still embodiments, the fibers are as a bundle of fibers and the particles are calcium carbonate. In still further embodiments, the composite is as a sheet molding composition with the fibers which are chopped in the polymer matrix. In further still embodiments, the fibers are distributed throughout the polymer matrix.

The present invention further relates to a method of electrostatic painting a reinforced composite material without using a conductive primer comprising the steps of: providing a reinforced composite material which comprises a polymeric matrix in admixture with a plurality of graphite coated fibers mixed in the polymeric matrix comprising the fibers having a high resistivity and having an outer surface, and exfoliated and pulverized platelets of the graphite having a particle size between about 0.1 and 500 microns coated on the outer surface of the fiber; and high resistivity particles coated with the graphite platelets; electrically grounding the reinforced composite material; providing a charged powder comprising a resin and a pigment; spraying the charged powder onto the electrically grounded reinforced composite material so as to coat the material; and curing the powder on the reinforced composite material in a curing oven, so as to electrostatically paint the reinforced composite material with the powder. In further embodiments, the fibers are glass fibers. In further still embodiments, the weight fraction of the platelets on the outer surface of the glass fibers is from about 0.01 wt % to about 15 wt % of the weight of the fibers and on the outer surface of the particles is from about 0.05 to 20% of the weight of the particles. In still further embodiments, the fibers comprise polymer fibers. In further still embodiments, the polymeric matrix comprises a thermoset or thermoplastic organic polymer. In further embodiments, the particles are calcium carbonate particles. In still further embodiments, the fibers are as a bundle of fibers. In further embodiments, the fibers are as a bundle of fibers and the particles are calcium carbonate. In still further embodiments, the composite is as a sheet molding composition with the fibers which are chopped in the polymer matrix.

The present invention still further relates to a method of making a plurality of low resistivity graphite coated fillers comprising the steps of: providing a plurality of high resistivity fillers; providing a graphite solution comprising exfoliated and pulverized graphite particles having a particle size between about 0.1 and 500 microns in the solution; coating the plurality of the fillers with the graphite solution; and drying the sprayed fillers to provide the low resistivity graphite coated fibers.

The present invention further still relates to a method of making a plurality of low resistivity graphite coated fillers comprising the steps of: providing a plurality of high resistivity fillers; providing a graphite solution comprising exfoliated and pulverized graphite particles having a particle size between about 0.1 and 500 microns in a solution; spraying the graphite solution onto the plurality of fillers for a time to provide sprayed fillers; and drying the sprayed fillers to provide the low resistivity graphite coated fillers.

The present invention still further relates to a method of making a plurality of low resistivity graphite coated fillers comprising the steps of: providing a plurality of high resistivity fillers; providing a graphite solution comprising exfoliated and pulverized graphite particles having a particle size between about 0.1 and 500 microns mixed in a solution; coating the plurality of fillers with the graphite solution; and drying the fillers to provide the low resistivity graphite coated fillers.

The present invention further still relates to a method of electrostatic painting a reinforced composite material without using a conductive primer comprising the steps of: providing a reinforced composite material which comprises a polymeric matrix; and a plurality of graphite coated fillers mixed in the polymeric matrix, each of the fillers comprising a high resistivity filler and having an outer surface, and exfoliated and pulverized graphite platelets having a particle size between about 0.1 and 500 microns coated on the outer surface of the filler to provide the coated filler; electrically grounding the reinforced composite material; providing a charged powder comprising a resin and a pigment; spraying the charged powder onto the electrically grounded reinforced composite material so as to coat the material; and curing the powder on the reinforced composite material in a curing oven, so as to electrostatically paint the reinforced composite material with the powder.

The present invention further relates to a reinforced composite material which comprises in admixture: polymeric matrix; and a plurality of graphite coated fillers mixed in the polymeric matrix, the filler having a high resistivity and having an outer surface, and exfoliated and pulverized platelets of the graphite having a particle size between about 0.1 and 500 microns coated on the outer surface of the filler, wherein the reinforced composite material enables electrostatic painting. In further embodiments, the filler comprises glass fibers. In still further embodiments, the weight fraction of the platelets on the outer surface of the glass fibers is from about 0.01 wt % to about 15 wt % of the weight of the fibers. In further still embodiments, the filler comprises polymer fibers. In still further embodiments, the polymeric matrix comprises a thermoset or thermoplastic organic polymer. In further still embodiments, the filler is particles. In still further embodiments, the filler is fibers as a bundle of fibers. In further embodiments, the filler is fibers as a bundle of fibers and particles. In further still embodiments, the composite is as a sheet molding composition wherein the filler is fibers which are in chopped form in the polymer matrix. In still further embodiments, the fibers are distributed throughout the polymer matrix.

The expanded graphite is formed by vaporizing a chemical intercalated in the graphite. In most cases, the chemical should be removed, preferably by heating, from the graphite by sufficient heating before mixing with polymers, since the chemical can degrade polymers. The expanded graphite is preferably formed in a radiofrequency wave applicator by heating the graphite precursor with microwave or radiofrequency waves. In some embodiments, a precursor graphite has been treated with a fuming oxy acid and heated to form the expanded graphite. The expanded graphite is then pulverized, and the pulverized particles are coated onto fibers to provide low resistivity graphite coated fibers and particles.

BRIEF DESCRIPTION OF THE DRAWINGS

FIG. 30 is a graph showing the impedance behavior of glass fiber/CaCO3/UPE composite.

FIG. 31 is a bar graph showing the resistivity of glass fiber/$CaCO_3$/UPE composite.

DESCRIPTION OF PREFERRED EMBODIMENTS

Figure 1:
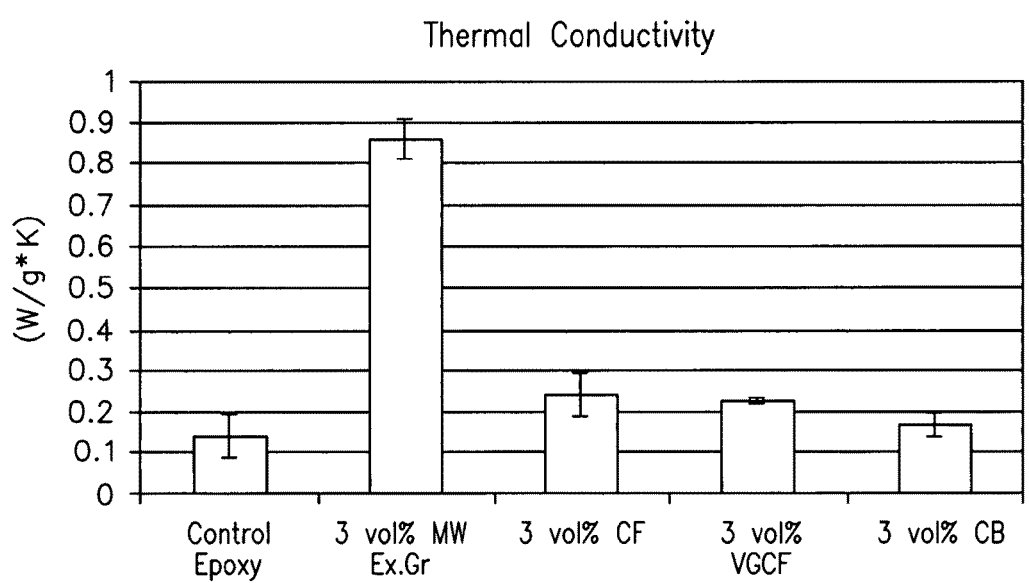
FIG. 1 is a histogram of the thermal conductivity of an epoxy polymer reinforced with various conductive particles.

All patents, patent applications, government publications, government regulations, and literature references cited in this specification are hereby incorporated herein by reference in their entirety. In case of conflict, the present description, including definitions, will control.

As used herein the abbreviation "PSSS" refers to anionic (−) poly(sodium 4-styrene sulfonate), which is a vinyl polymer.

As used herein the abbreviation "PDAC" refers to cationic (+) poly(diallyldimethylammonium chloride), which is a vinyl polymer.

As used herein the term "anionic polyelectrolyte" refers to any anionic polymer known in the art, including but not limited to poly(sodium 4-styrene sulfonate) (PSSS). The term "anionic polymer" refers to any polymer, organic or inorganic, having repeating subunits with negatively charged groups along the polymer chain.

As used herein the term "cationic polyelectrolyte" refers any cationic polymer known in the art, including but not limited to poly(diallyldimethylammonium chloride) (PDAC). The term "cationic polymer" refers to any polymer, organic or inorganic, having repeating subunits with positively charged groups along the polymer chain.

As used herein the term "electrically insulating fiber" refers to any fiber with an electronic resistance that increases with decreasing frequency. Some examples include glass fibers or polymer fibers. The term "fiber" refers to any fiber, such as but not including, glass and polymer fibers.

As used herein the term "low resistivity graphite coated fiber" refers to a fiber coated with exfoliated and pulverized graphite platelets that has a resistivity at a frequency of 1 Hz that is lower than the resistivity of an untreated (raw) fiber.

As used herein the term "reinforced composite material" refers to a composite material having added reinforcements. The composite material can comprise any thermoset or thermoplastic polymeric matrix known in the art. For example, the term "SMC" refers to sheet molding compound, a glass fiber reinforced polymeric material formed by compression molding.

As used herein the abbreviation "CF" refers to carbon fibers.

As used herein the abbreviations "VGCF" or "vgCF" refer to vapor grown carbon fibers.

As used herein the abbreviation "CB" refers to particulate carbon black.

As used herein the abbreviation "PAN" refers to polyacrylonitrile.

Graphite is a layered material that is a very good thermal and electrical conductor. Individual molecular layers of graphite are held together with weak Van der Waals forces that are capable of being intercalated with organic or inorganic molecules. The intercalated molecules can be used for separation of the graphite layers to form expanded graphite. An expanded graphite is one that has been heated to separate individual platelets of graphite. An exfoliated graphite is a form of expanded graphite where the individual platelets are separated by heating with or without an agent such as a polymer or polymer component. The graphite expands to form very large platelets having large diameters and very thin thicknesses. The expanded graphite usually does not have any significant order as evidenced by x-ray diffraction patterns. The exfoliated graphite is pulverized to form the nanographite platelets. As used herein the abbreviation "xGnP" refers to exfoliated nanographite platelets. Exfoliated nanographite platelets (xGnP) are exfoliated and pulverized graphite to a particle size between about 0.1 and 500 microns.

Expanded graphite results in superior mechanical properties and in addition has desirable electrical properties if a sufficient amount of the expanded graphite is present in a polymer matrix. Expanded graphite platelets have interbasal plane surfaces with reactive sites on the edges of the platelets. Different chemical groups can be added to the edges. The application of an electric field can also be used to orient the expanded graphite platelets in a preferred direction creating materials which are electrically or thermally conductive in one direction. Submicron conductive paths can thus be created to act as nanosized wires.

The use of microwave (MW) energy or radiofrequency (RF) induction heating provides a fast and economical method to produce expanded graphite nanoflakes, graphite nanosheets, or graphite nanoparticles. The microwave or radiofrequency methods are especially useful in large-scale production and are very cost-effective. The combination of radiofrequency or microwave expansion and appropriate grinding technique, such as planetary ball milling (and vibratory ball milling), produces nanoplatelet graphite flakes with a high aspect ratio efficiently. Microwave or radiofrequency expansion and pulverization of the crystalline graphite to produce suitable graphite flakes enables control of the size distribution of graphite flakes more efficiently. By incorporating an appropriate surface treatment, the process offers an economical method to produce a surface treated expanded graphite.

Chemically intercalated graphite flakes are expanded by application of the radiofrequency or microwave energy. The expansion occurs rapidly. Heating for three to five minutes removes the expanding chemical. The graphite absorbs the radiofrequency or microwave energy very quickly without being limited by convection and conduction heat transfer mechanisms. The intercalant heats up past the boiling point and causes the graphite to expand to many times its original volume. The process can be performed continuously by using a commercially available induction or microwave system with conveyors. Although a commercial microwave oven operating at 2.45 GHz was used for the following experiments, radio frequency (induction heating) or microwave frequency energy across a wide range can be used for this purpose.

The expanded graphite is pulverized for instance by ball milling, mechanical grinding, air milling, or ultrasonic wave to produce graphite flakes (platelets) with high aspect ratio. These flakes are used as reinforcements in various matrices including polymers and metals. Also these flakes can be used, for instance, as anode materials, or substrates for metal catalysts. The exfoliated graphite flakes can be provided in a polymer matrix composite to improve the mechanical, electrical and thermal properties. In some embodiments the intercalated graphite flakes are expanded by application of microwave energy at 2.45 GHz. Exfoliated and pulverized graphite and methods of producing the exfoliated and pulverized graphite are described in U.S. Patent Application Publication No. 2004/0127621 to Drzal et al. (copending U.S. patent application Ser. No. 10/659,577), filed Sep. 10, 2003, hereby incorporated herein by reference in its entirety. This microwave expansion process can be done continuously by using a commercially available microwave system with conveyors or the other devices as described in U.S. patent application Ser. No. 11/435,350, filed May 16, 2006, hereby incorporated herein by reference in its entirety.

Natural graphite can be exfoliated to produce nano sized platelets of graphite that can be dispersed in either organic or water based systems. In experiments conducted with both thermoset and thermoplastic polymers, exfoliated graphite nanoplatelets (xGnP) have been successfully dispersed and their mechanical, electrical, barrier and thermal properties have been measured. It was found that as little as three (3) volume percent of the xGnP reduced the AC impedance by a factor of $10^9$-$10^{10}$, a level sufficient to not only provide electrostatic charge dissipation, but also to decrease the electrical resistance to the point where the polymer composite has sufficient conductivity to undergo electrostatic painting and to function for electromagnetic interference (EMI) shielding.

The composite material made from thermoset polymer systems, such as epoxy, polyurethane, polyurea, polysiloxane and alkyds, where polymer curing involves coupling or crosslinking reactions. The composite material can be applied as well to thermoplastic polymers for instance polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactons, polylactides, polyimides, and polyolefins (vinyl-containing thermoplastics). Specifically included are polypropylene, nylon and polycarbonate. The polymer can be for instance an epoxy resin. The epoxy resin cures when heated. The epoxy composite material preferably contains less than about 8% by weight of the expanded graphite platelets. Thermoplastic polymers are widely used in many industries.

Nanolayers of the exfoliated graphite on glass fibers and their efficacy at improving the conductivity of the coated glass fibers is described herein. The effect of nanographite platelet size, concentration and surface chemistry on the conductivity of glass fibers and the resulting SMC or other recommended composite system is described. These results can be extended to the glass fiber sizing/finish solution to produce a level of conduction on glass fibers and fillers applicable to production methods. Furthermore, the electrical conductivity, mechanical properties and processability of the selected formulation (SMC or thermoplastic system) of the xGnP coated glass fiber can be optimized.

Epoxy matrix composites have been successfully fabricated using exfoliated graphite nanoplatelets (xGnP) of various diameters and at various concentrations up to three volume percent (3 vol %) as described in U.S. Patent Application Publication No. 2004/0127621 to Drzal et al. (copending U.S. patent application Ser. No. 10/659,577), filed Sep. 10, 2003. A flexural modulus of approximately 3.9 GPa could be attained with the xGnP which was significantly greater than composites reinforced with carbon fibers (CF), vapor grown carbon fibers (vgCF) and particulate carbon black (CB) at the same concentrations. Concentrations of up to twenty-five volume percent (25 vol %) can be attained with a modulus of approximately 12 GPa. The surface chemistry of the xGnP is important also. The flexural modulus of the acrylonitrile grafted surface has superior properties to the other surface treatments of xGnP.

Figure 2:
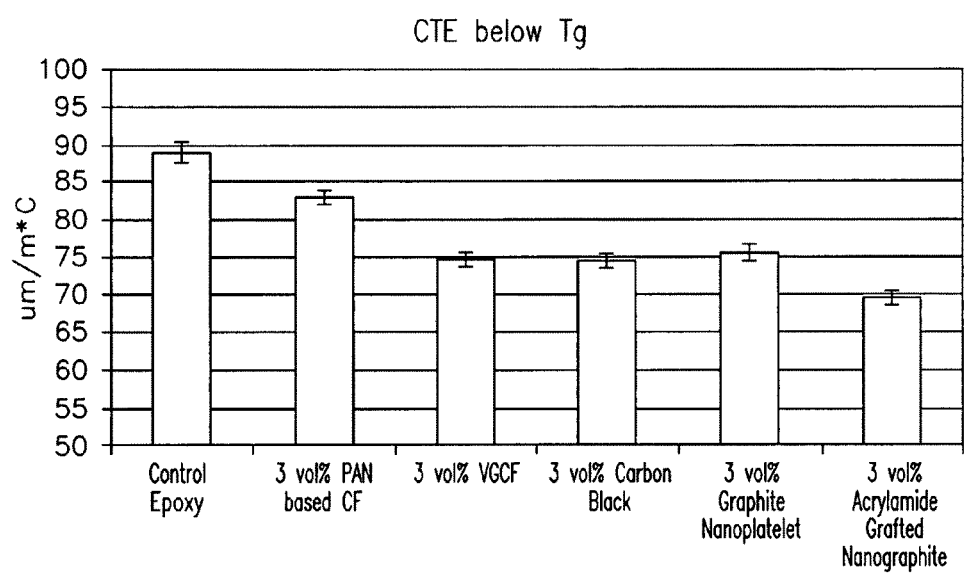
FIG. 2 is a histogram of the coefficient of thermal expansion of epoxy reinforced with various conductive particles.

The thermal and electrical properties of composites made from these reinforcements also showed significant differences based on the reinforcements size concentrations and morphology. Thermal conductivity measurements, illustrated in FIG. 1, show that large exfoliated nanographite platelets can attain higher thermal conductivities than fibrous reinforcements or carbon black at the same concentration. Furthermore there is a corresponding reduction in the coefficient of thermal expansion, as illustrated in FIG. 2. Recent results at higher concentrations have reduced the coefficient of thermal expansion (CTE) to approximately forty.

AC Impedance measurements detected a reduction of approximately ten orders of magnitude in the composites made from xGnP at a concentration of two volume percent (2 vol %), similar to the CB, vgCF and CF required concentrations to eight and twelve volume percent respectively to produce the same reduction in impedance. The small concentration necessary for percolation and the large reduction in impedance are significant. This value is well beyond what is required for electrostatic spraying and into the regime where these materials would show electromagnetic interference (EMI) and radiofrequency (RF) shielding properties. Exfoliated graphite nanoplatelets can be produced as large, thin sheets. They can be produced inexpensively, suspended in water or organic solvent, deposited onto surfaces, dispersed in thermoset or thermoplastic polymers, and used to increase electrical conductivity. The ability to produce an electrically conductive SMC would provide significant advantages for the automobile industry. The use of a conductive primer could be eliminated and electrostatic painting could be accomplished directly on the SMC part. Also, an SMC with EM shielding could be produced. Each of these contribute to the increased economic and performance attractiveness of SMC.

Since material electrical conductivity is largely dominated by surface conduction mechanisms, the ability to deposit xGnP on glass fibers in nanolayers thicknesses creates a unique opportunity to increase the conductivity of glass fibers without a significant increase in cost, change in composition, or change in processing. The xGnP can be dispersed in the sizing/finishing solution and applied to the glass fibers emerging from the production die in a manner similar to current sizing/finishing application procedures with little if any modification to the process.

The following stepwise approach is taken herein. First, the ability to deposit xGnP onto glass fibers from a water based solution is demonstrated. Second, the amount of xGnP that must be deposited on the fiber surface to increase the glass fiber electrical conductivity to levels suitable for electrostatic painting is determined. Third, the resin system to be used is selected. Fourth, it is demonstrated that xGnP can be applied to the glass fiber from sizing/finish solution and produce a level of conduction sufficient for direct electrostatic painting of SMC or thermoplastic composites. Fifth, the electrical conductivity, mechanical properties and processability of the selected formulation (SMC or thermoplastic system) of the xGnP coated glass fiber is investigated and optimized. Finally, the combination of graphite coated particles and the coated fibers is described.

Electrostatic painting can thereby be accomplished on a reinforced composite material without using a conductive primer. An electrically conductive reinforced composite material of the present invention comprises a polymeric matrix and low resistivity graphite coated fibers mixed in the polymeric matrix. Each of the low resistivity coated fibers have exfoliated and pulverized graphite platelets on the outer surface of the fiber. The reinforced composite material has sufficient conductivity to undergo electrostatic painting and to provide EMI and RF shielding. To perform electrostatic painting the reinforced composite material is electrically grounded. A charged powder with a resin and a pigment is sprayed onto the electrically grounded reinforced composite material so as to coat the material. Next, the powder on the reinforced composite material is cured in a curing oven. Electrostatic painting apparatuses and methods are described in U.S. Pat. No. 4,660,771 to Chabert et al, U.S. Pat. No. 6,455,110 to Fortuyn et al., U.S. Pat. No. 6,659,367 to Ballu, and U.S. Pat. No. 6,776,362 to Kawamoto et al., each of which is hereby incorporated herein by reference in its entirety.

Various surfactants have been found to produce suspensions of xGnP in water that are stable for periods of up to several weeks. Drops of these xGnP suspensions have been deposited on silicon wafers and spin coated. Atomic Force Microscopy (AFM) characterization of these surfaces shows that the xGnP are dispersed uniformly over the surface. Approximately ten micron (~10 μm) water sized glass fibers were repetitively immersed in the xGnP suspensions in the following Examples. The surfaces were then examined with AFM and environmental scanning electron microscopy (ESEM) to determine the ability of the solution to produce a uniform coating as a function of the number of immersions. The increase in weight of the fiber after immersion was then measured on a gravimetric balance. Surface conductivity measurements were conducted in parallel with the coating experiments. The electrical resistance of selected fibers can be measured over a twenty-five millimeter (25 mm) gage length to determine the surface concentration that is required to produce a substantial change in surface conductivity.

It has been shown herein in the following Examples that glass fibers can be quickly and conveniently coated with conductive, exfoliated nanographite platelets (xGnP) through a variety of means so that the glass fibers exhibit acceptable levels of electrical conductivity. As a result of this the following conclusions can be made. First, xGnP can be coated on the surface of glass fiber with a variety of methods and chemical processes, such as dipping the glass fiber into a water based suspension of a polyelectrolyte with xGnP, and spraying the water based suspension of a polyelectrolyte with xGnP. Second, the electrical resistance of the glass fiber was reduced to levels that made the graphite coated glass fiber conductive for electrostatic spraying, and the resulting conductivity depends upon the concentration of graphite and polyelectrolyte. Third, one layer of graphite coating is more effective and results in better conductivity than multi-layer graphite coatings. Fourth, the amount of graphite coated on glass fiber resulting in the best conductivity is preferably only about 0.16 to about 0.2 weight percent (wt %) of the fibers. In some embodiments, the amount can be between about 0.01 and 1.0 percent by weight (wt %) of the fibers. These conclusions are based upon experimental results as described fully in the following Examples.

EXAMPLES WITH FIBERS ALONE

Materials: Poly(Sodium 4-Styrene Sulfonate) (PSSS) with molecular weight of 70,000, poly(diallyldimethylammonium chloride) (PDAC) with molecular weight of 400,000-500,000 (20% in solution), and sodium dodecylbenzene sulfonate (SDBS) were purchased from Sigma-Aldrich (St. Louis, Mo.). Glass fibers were supplied by Johns Manville (Denver, Colo.). One micron (1 μm) size exfoliated graphite nanoplatelets (xGnP-1) were processed at the Composite Materials and Structures Center, Michigan State University (East Lansing, Mich.). The graphite was exfoliated and pulverized as described in U.S. Patent Application Publication No. 2004/0127621 to Drzal et al. (copending U.S. patent application Ser. No. 10/659,577), filed Sep. 10, 2003.

Sample preparation: Preparation of water based graphite solution is performed as follows. Predetermined amounts of xGnP, deionized (DI) water and polyelectrolyte (surfactant) were ultrasonically mixed for ten minutes (10 min), to produce 0.2 wt % and 1.0 wt % xGnP-1 water based solution. Detailed formulation information is shown in Table 1.

TABLE 1

Composition of water based xGnP solution.

| # | DI water (g) | Poly-electrolyte (PE)(g) | SDBS (g) | 1-μm xGnP (g) | Weight fraction of xGnP (%) | Weight fraction of PE/SDBS (%) |
|---|---|---|---|---|---|---|
| 1 | 50 | — | 0.1 | 0.1 | 0.2 | 0.2 |
| 2 | 50 | PDAC0.1 | — | 0.1 | 0.2 | 0.2 |
| 3 | 50 | PSSS0.1 | — | 0.1 | 0.2 | 0.2 |
| 4 | 50 | — | 0.25 | 0.5 | 1.0 | 0.5 |

TABLE 1-continued

Composition of water based xGnP solution.

| # | DI water (g) | Poly-electrolyte (PE)(g) | SDBS (g) | 1-μm xGnP (g) | Weight fraction of xGnP (%) | Weight fraction of PE/SDBS (%) |
|---|---|---|---|---|---|---|
| 5 | 50 | PDAC 0.25 | — | 0.5 | 1.0 | 0.5 |
| 6 | 50 | PSSS 0.25 | — | 0.5 | 1.0 | 0.5 |

Figure 3A:
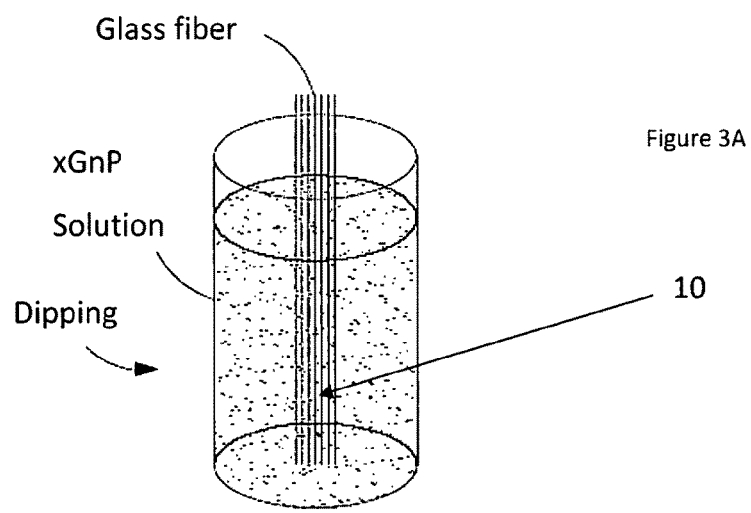
FIGS. 3A and 3B are illustrations of dip coating and drying of glass fibers 10.
Figure 3B:
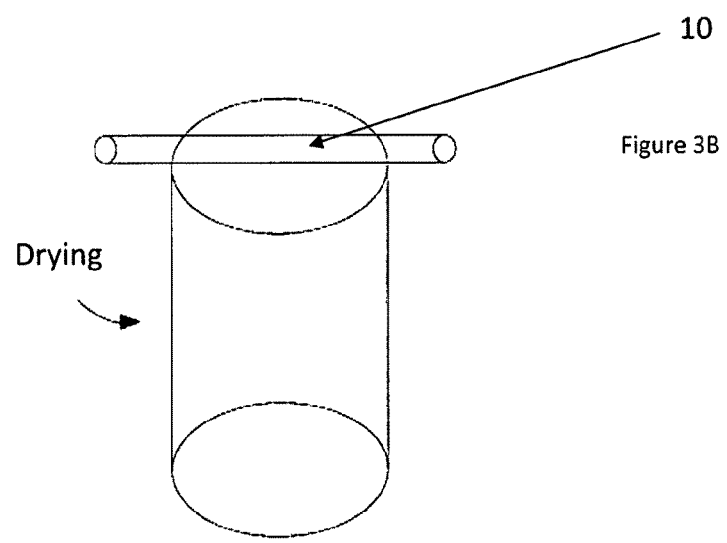

Dip coating of the glass fibers: A schematic illustrating the dip coating of glass fibers 10 is shown in FIG. 3. The glass fiber bundle is dipped into the water based graphite solution for sixty (60) seconds at graphite concentration of 0.2 wt % and 1 wt %, using a self assembly layer by layer technology. One (1) dipping cycle includes first dipping into the positive charged polymer solution for ten seconds (10 s) and then dipping into water to remove excess polymer, followed by a second dipping into negative charged polymer solution for ten seconds. Finally, the fiber bundle 10 is removed and dried at room temperature for more than twelve hours.

Figure 4:
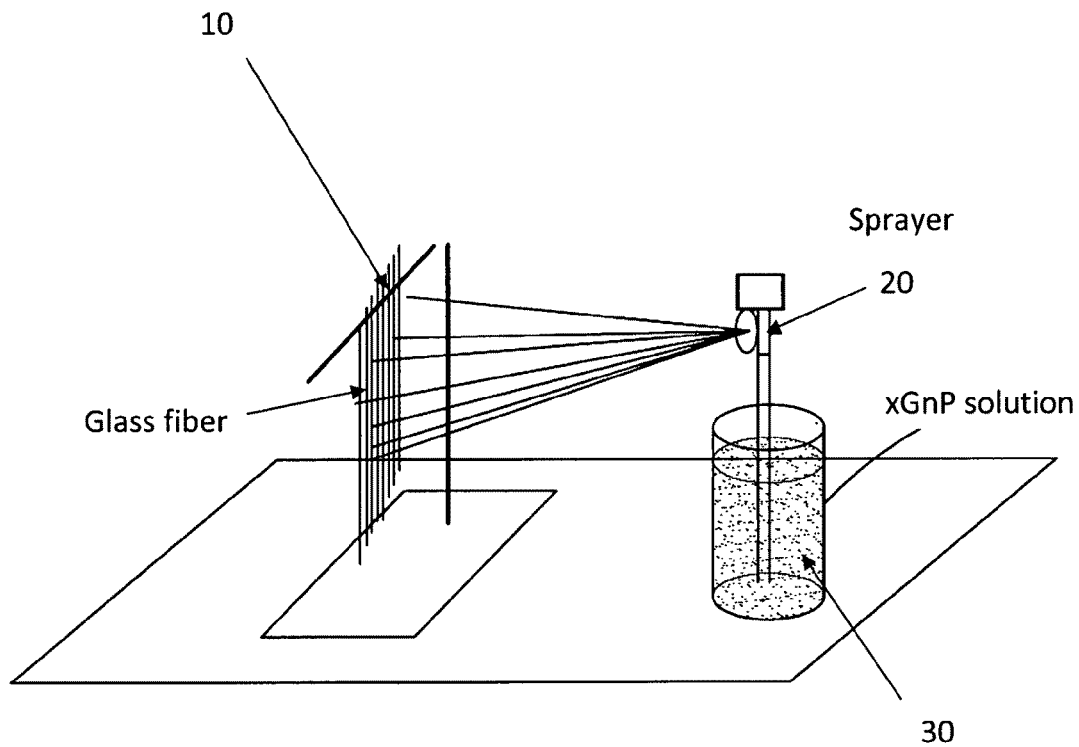
FIG. 4 is an illustration of spray coating of glass fibers 10.

Spray coating of the glass fibers: A schematic illustration of spray coating glass fibers 10 is shown in FIG. 4. In one embodiment, a plastic sprayer 20 can be used to spray the 1 wt % water based graphite solution 30 (xGnP) onto the surface of hung glass fibers 30. In one embodiment, the spraying time is about ten seconds. Next, the fiber bundle is dried at room temperature for more than twelve hours.

Characterization.

Electrical properties: The resistance of raw and xGnP coated glass fiber was measured by Impedance Spectroscopy by applying a two-probe method at room temperature. The length of glass fiber was twenty-five millimeters (25 mm). The resistivity then was calculated by followed equation: Resistivity=Resistance*W/L (surface resistivity), where W is the width of glass fiber (refers to the punch glass fibers width=2000*n*D), and L is the length of glass fiber (25 mm).

Morphology: The surface of xGnP coated glass fiber was observed by means of Environmental Scanning Electron Microscopy (ESEM) using a Philips Electroscan 2020 with accelerating voltage of 20 KV.

TGA analysis: A thermogravimetric analyzer (2950 TGA, TA instruments, USA) was used to measure the decomposition behavior of xGnP and xGnP coated glass fiber under air gas with heat rate of 10° C./min.

Figure 5:
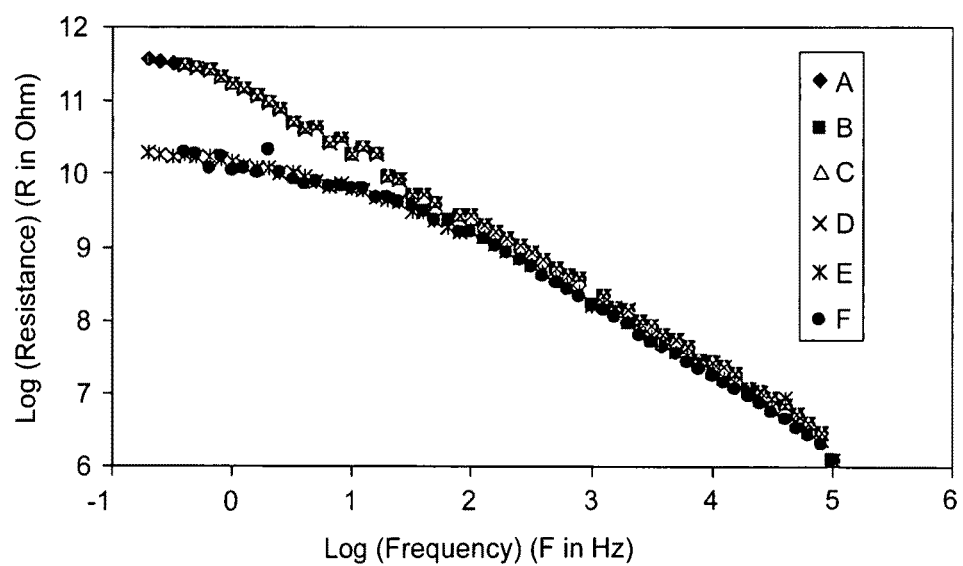
FIG. 5 is a graph illustrating the log (resistance) vs. log (frequency) of coated glass fibers. A=Raw glass fiber; B=0.2 wt % xGnP PDAC/PSSS coated glass fiber; C=0.2 wt % xGnP PSSS/PDAC coated glass fiber; D=0.2 wt % xGnP SDBS coated glass fiber; E=0.2 wt % xGnP PDAC coated glass fiber; F=0.2 wt % xGnP PSSS coated glass fiber.

Results: The resistance (AC impedance) from electrochemical impedance spectroscopy is shown in FIG. 5. It was found that electronic resistance had a lower value at higher frequencies, and the resistance increased with decreasing frequency. This is a typical characteristic of an insulator. Raw and xGnP coated glass fibers displayed a similar trend. This data suggests that all of the coated glass fibers are not conductive.

Figure 6:
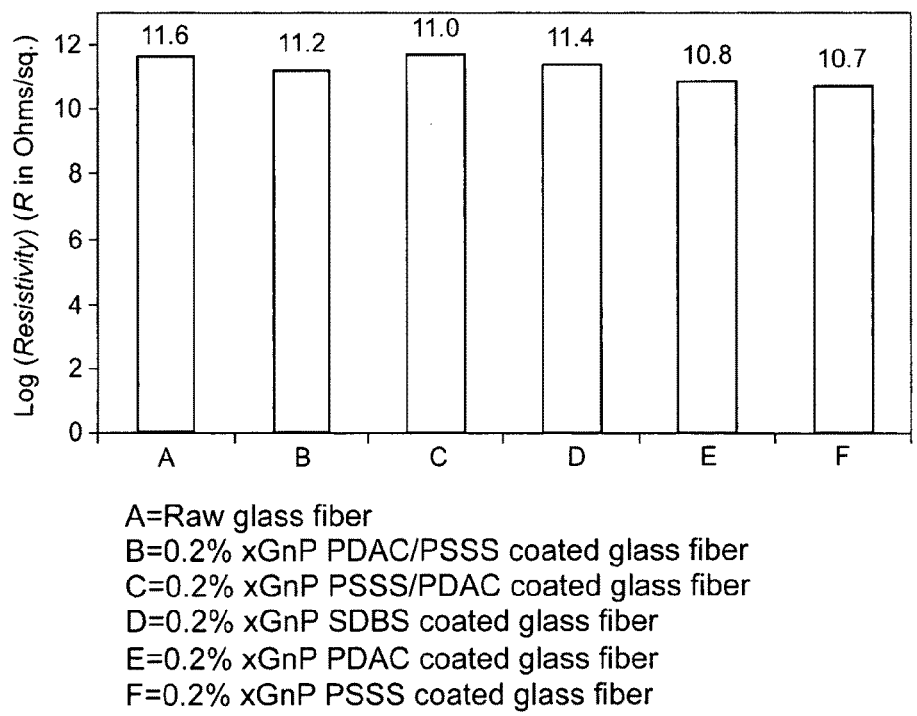
FIG. 6 is a histogram illustrating the log (resistivity) at 1 Hz of coated glass fibers. A=Raw glass fiber; B=0.2 wt % xGnP PDAC/PSSS coated glass fiber; C=0.2 wt % xGnP PSSS/PDAC coated glass fiber; D=0.2 wt % xGnP SDBS coated glass fiber; E=0.2 wt % xGnP PDAC coated glass fiber; F=0.2 wt % xGnP PSSS coated glass fiber.
Figure 7:
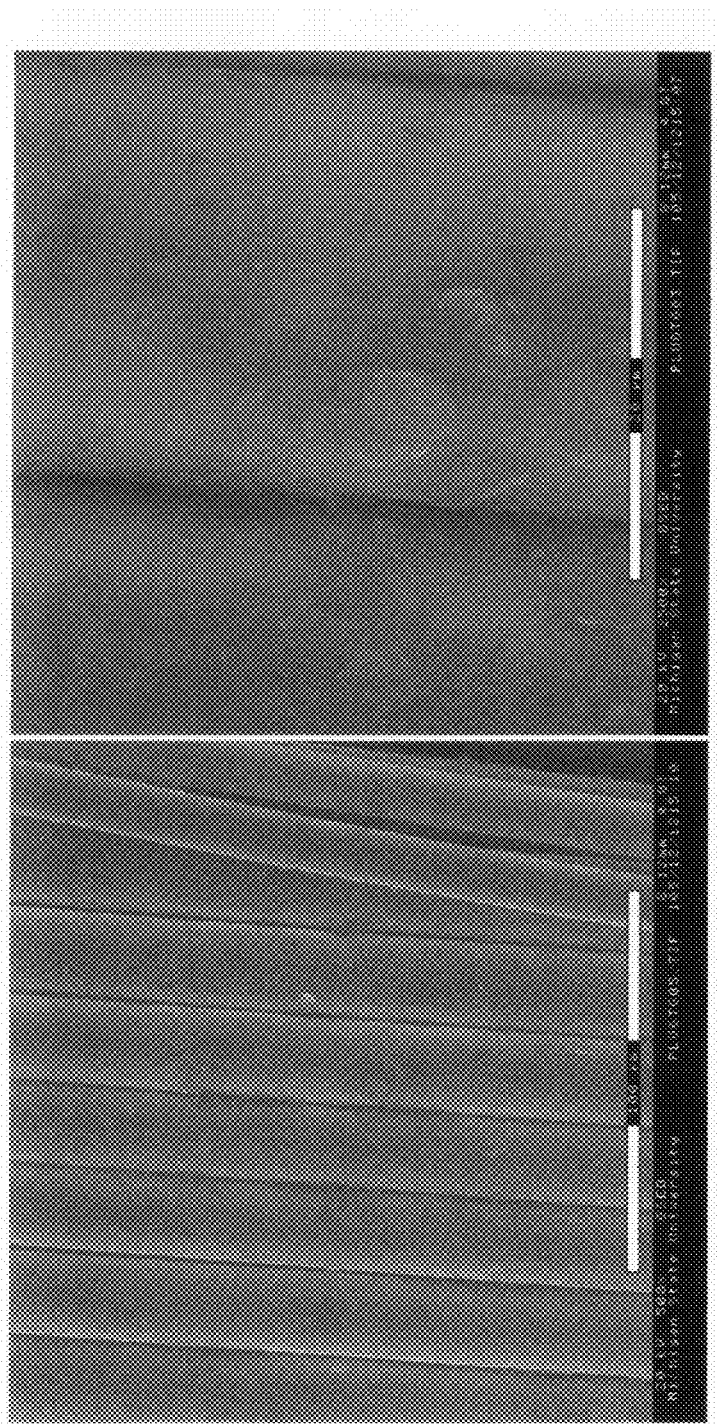
FIG. 7 is an ESEM image of a 0.2% xGnP/PDAC coated glass fiber.
Figure 8:
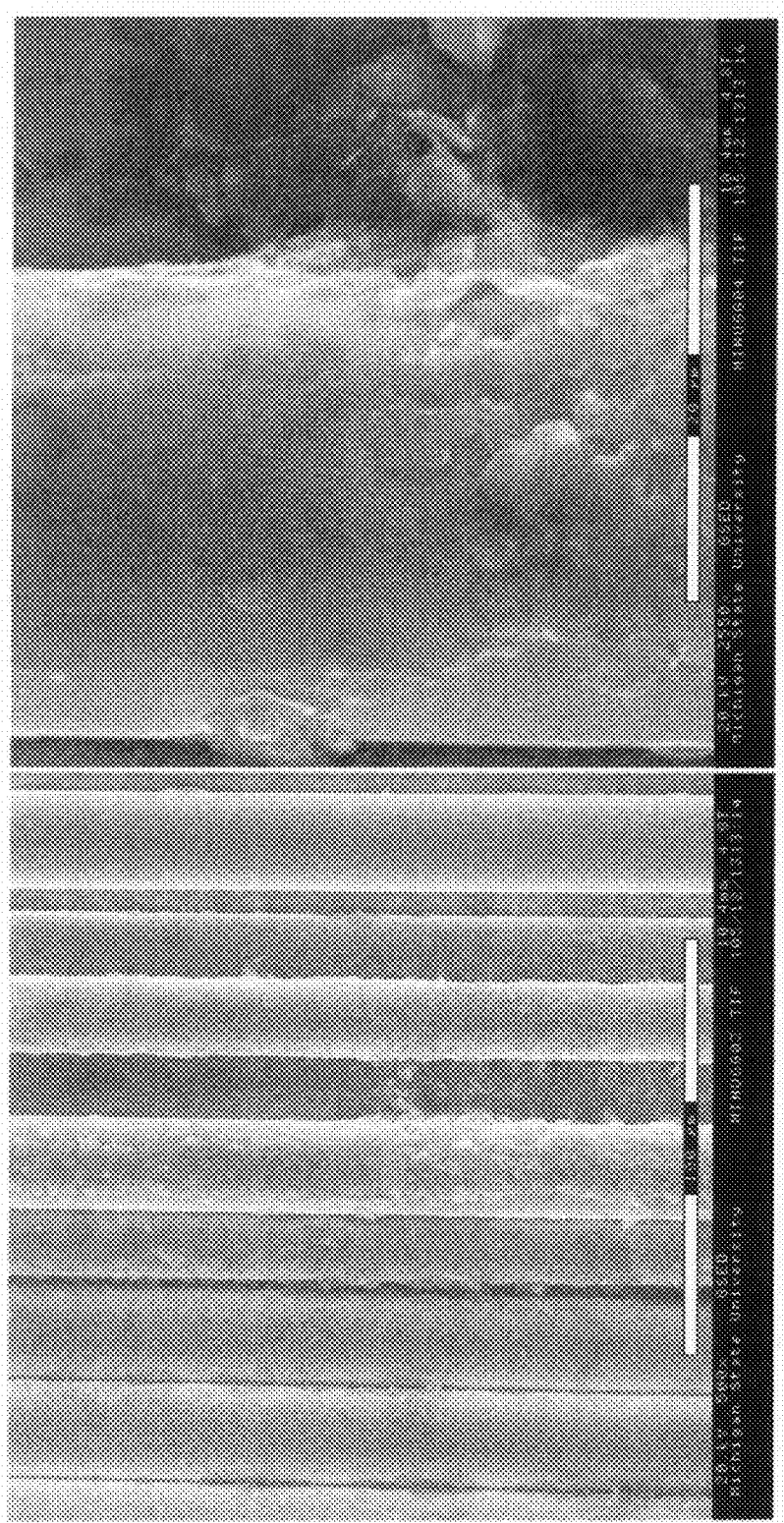
FIG. 8 is an ESEM image of an 0.2% xGnP/PSSS coated glass fiber.
Figure 9:
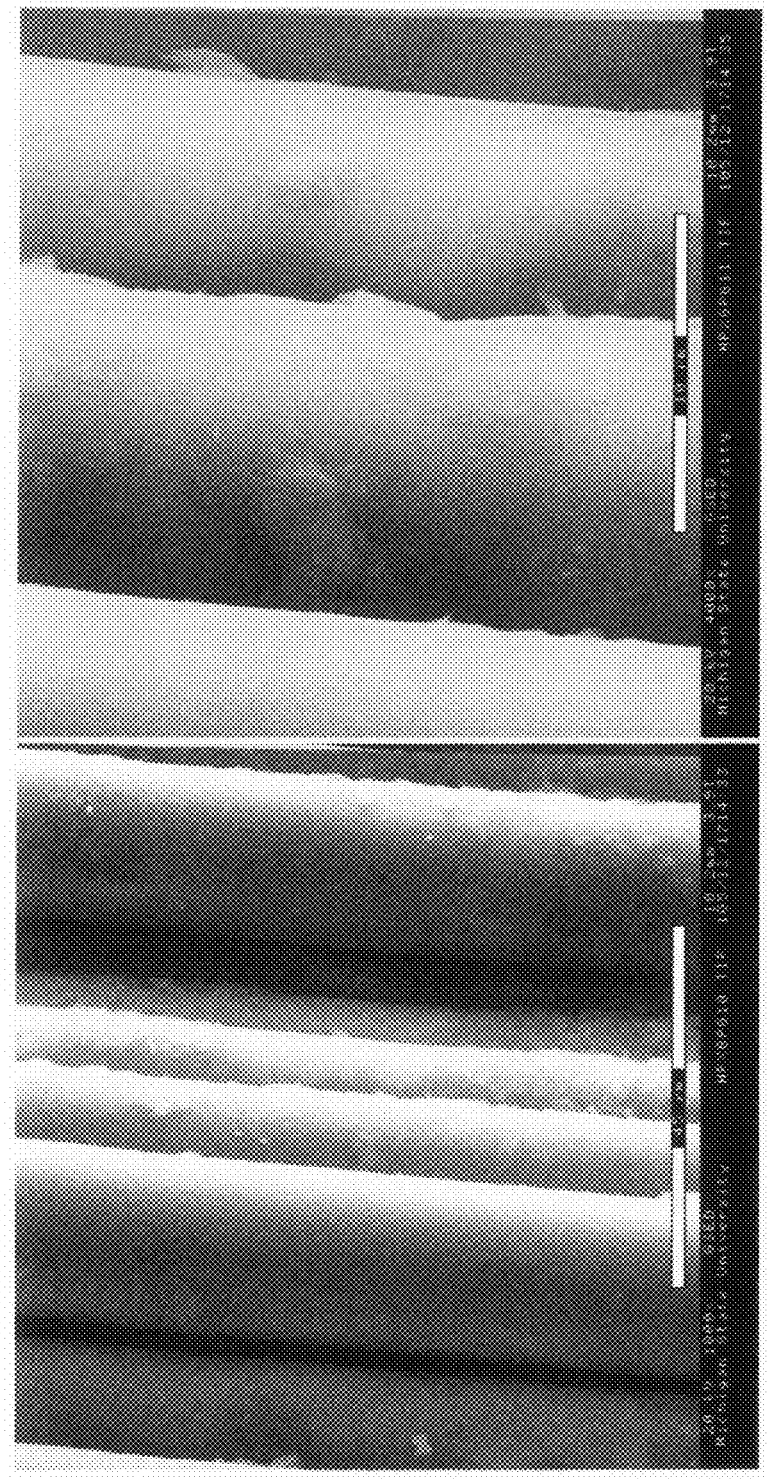
FIG. 9 is an ESEM image of an 0.2% xGnP/PSSS and 0.2% xGnP/PDAC coated glass fiber (3 cycles).
Figure 10:
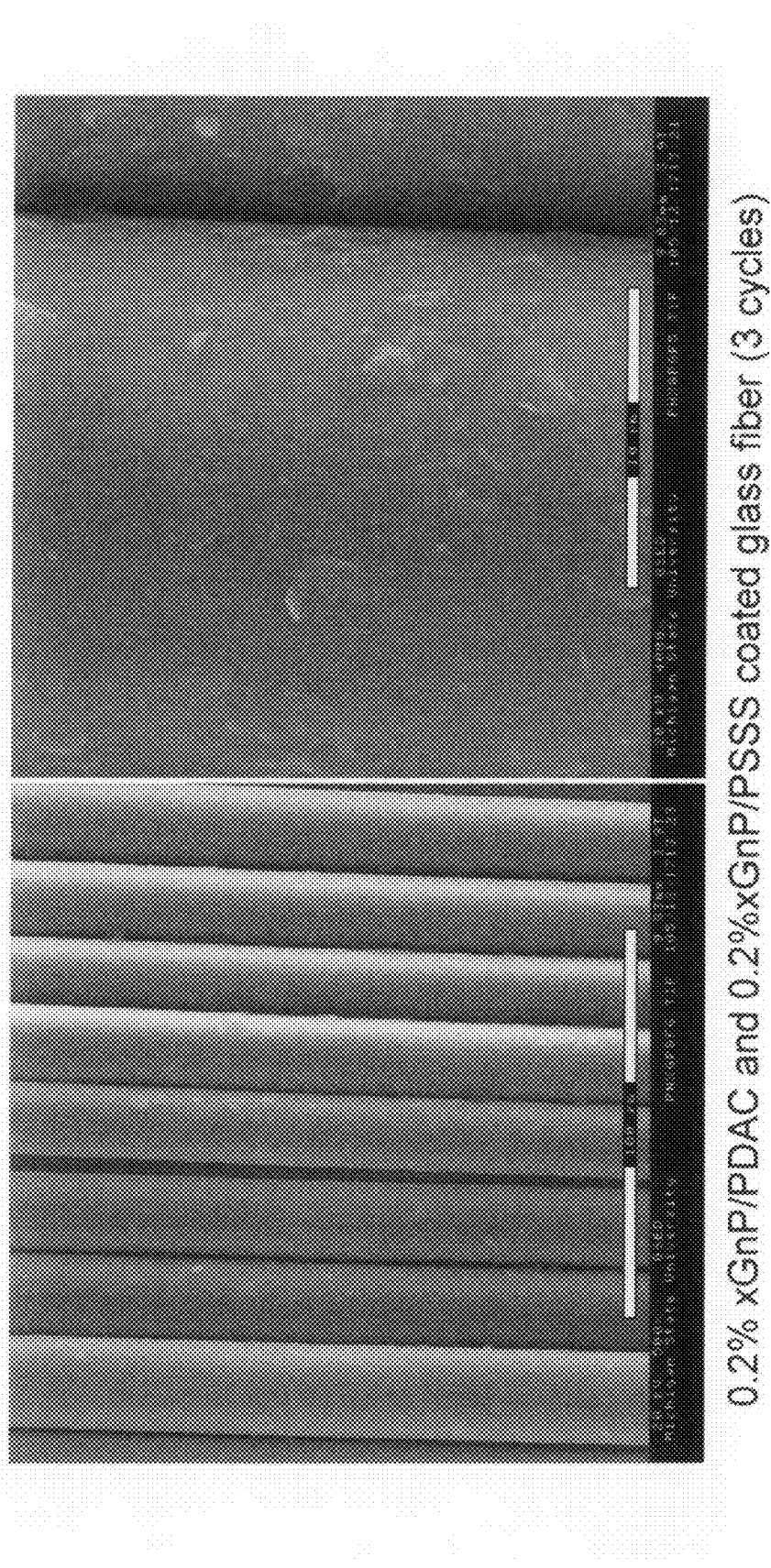
FIG. 10 is an ESEM image of an 0.2% xGnP/PDAC and 0.2% xGnP/PSSS coated glass fiber (3 cycles).

The resistivity of coated glass fibers at a frequency of 1 Hz is shown in FIG. 6. It is clear that the resistivity of glass fibers coated with 0.2 wt % xGnP solution was only marginally reduced. This data indicates that 0.2 wt % water based xGnP solution is not enough to reduce the resistivity of glass fiber.

The ESEM image of xGnP a graphite coated glass fiber is shown in FIG. 7 through FIG. 10. Exfoliated graphite nanoplatelets (xGnP) were found attached on the glass fiber surface when using the water based solution. The solutions included xGnP water based SDBS solution, xGnP water based PDAC solution, and xGnP water based PSSS solution. These results illustrate that xGnP has the ability to be coated on the surface of glass fiber. Using the self assembling technology, even after six layers of xGnP were coated on the glass fiber surface, the coating of xGnP was not continuous on the glass fiber surface. This result suggests that the concentration of the xGnP water based solution is not high enough to coat the glass fiber and thus does not result in enough xGnP material on the glass fiber surface to reduce the resistivity. Therefore, it is necessary to increase the concentration of xGnP water based solution.

Figure 11:
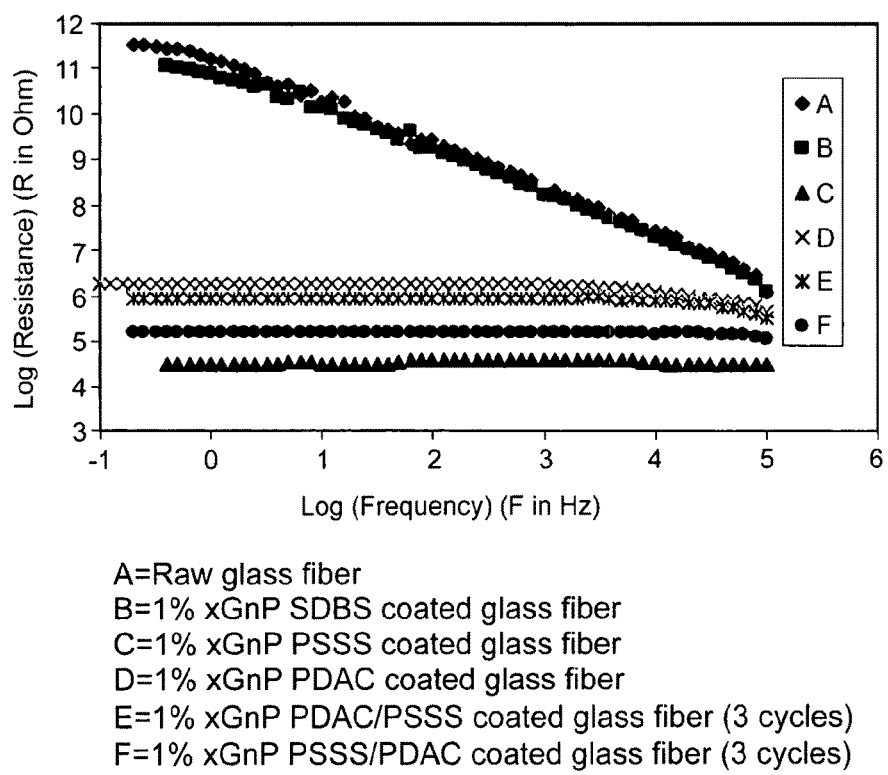
FIG. 11 is a graph illustrating the log (resistance) vs. log (frequency) of coated glass fibers. A=Raw glass fiber; B=1 wt % xGnP SDBS coated glass fiber; C=1 wt % xGnP PSSS coated glass fiber; D=1 wt % xGnP PDAC coated glass fiber; E=1 wt % xGnP PDAC/PSSS coated glass fiber (3 cycles); F=1 wt % xGnP PSSS/PDAC coated glass fiber (3 cycles).
Figure 12:
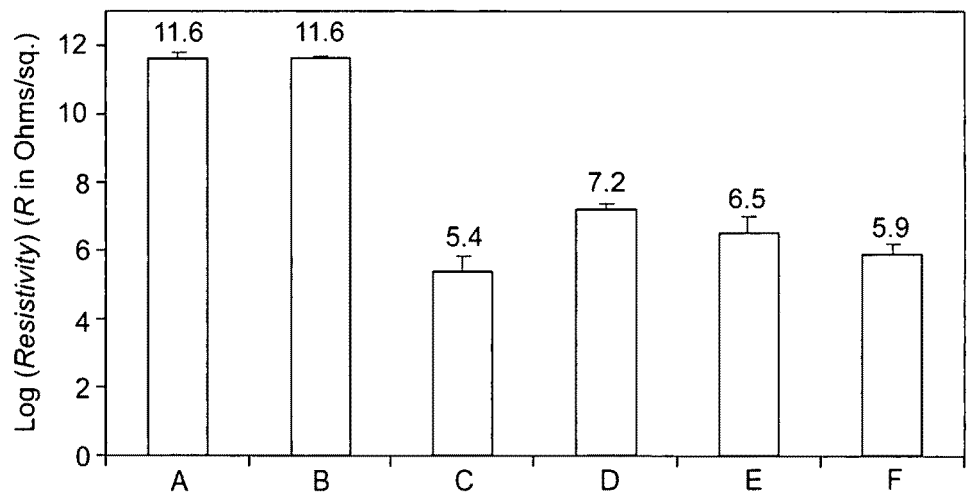
FIG. 12 is a histogram illustrating the log (resistivity) at 1 Hz of coated glass fibers. A=Raw glass fiber; B=1 wt % xGnP SDBS coated glass fiber; C=1 wt % xGnP PSSS coated glass fiber; D=1 wt % xGnP PDAC coated glass fiber; E=1 wt % xGnP PDAC/PSSS coated glass fiber (3 cycles); F=1 wt % xGnP PSSS/PDAC coated glass fiber (3 cycles).

The AC impedance behavior of raw and coated glass fibers, using a 1.0 wt % xGnP water based solution, are shown in FIG. 11. It was found that using a 1.0 wt % xGnP water based SDBS surfactant solution to coat glass fibers did not change the impedance behavior, as compared with raw glass fiber. This shows that the xGnP water based surfactant solution does not work well for coating of the glass fiber surface. However, glass fiber coated with xGnP using PSSS, PDAC or an alternating layer-by-layer approach, significantly improved the conductivity. The resistance decreases by six orders of magnitude and was constant over the entire range of frequencies. This is a typical feature of conductive materials. In this case, the xGnP coating makes glass fiber conductive. The resistance of glass fiber is reduced by using a 1.0 wt % xGnP water based polyelectrolyte solution coating. The resistivity of the various coated glass fibers at 1 Hz is shown in FIG. 12. The resistivity of glass fiber significantly decreased about six orders using appropriate xGnP water based solutions. It was found that using the self-assembling layer-by-layer technology is not helpful to reduce the resistivity of glass fiber.

Figure 13:
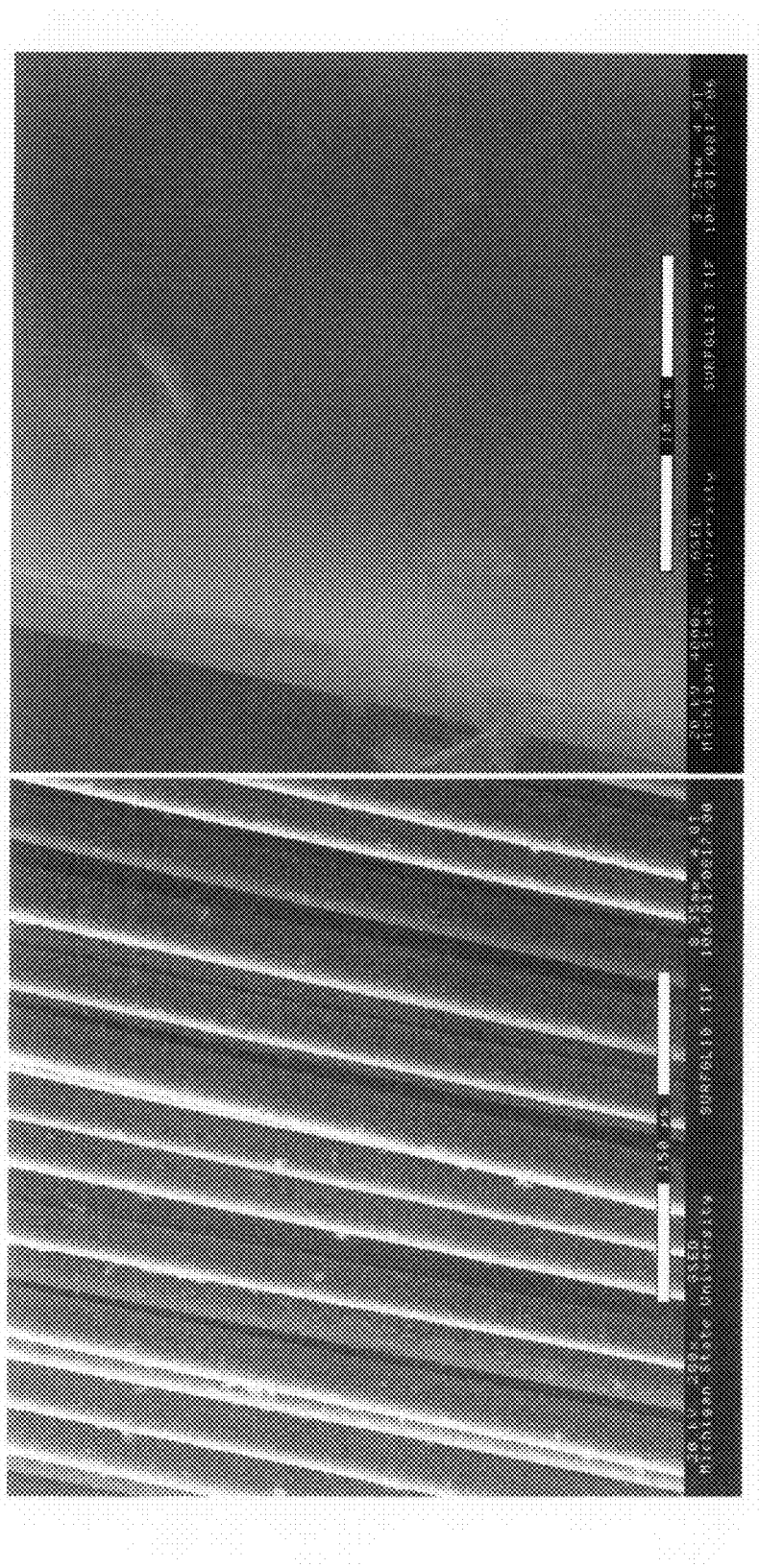
FIG. 13 is an ESEM image of a 1 wt % xGnP/SDBS coated glass fiber.
Figure 14:
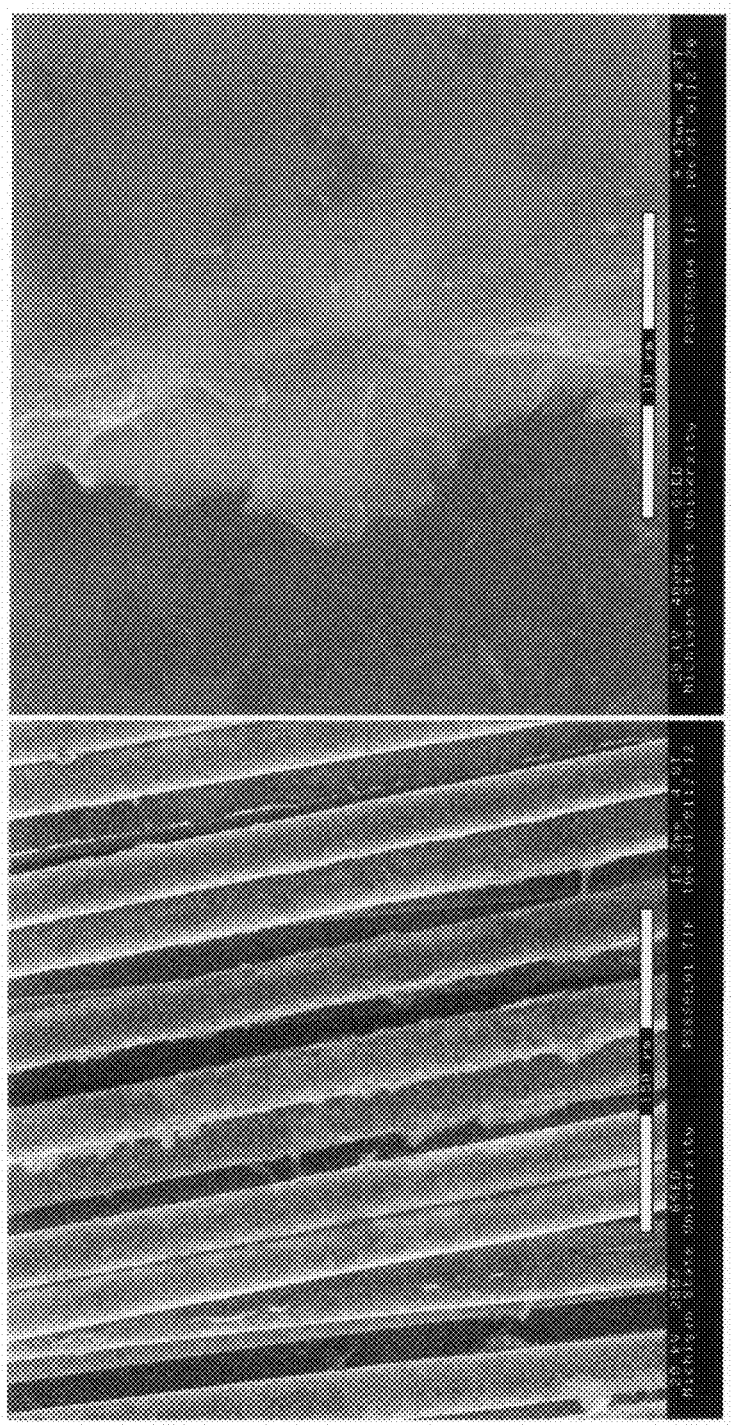
FIG. 14 is an ESEM image of a 1 wt % xGnP/PSSS coated glass fiber.
Figure 15:
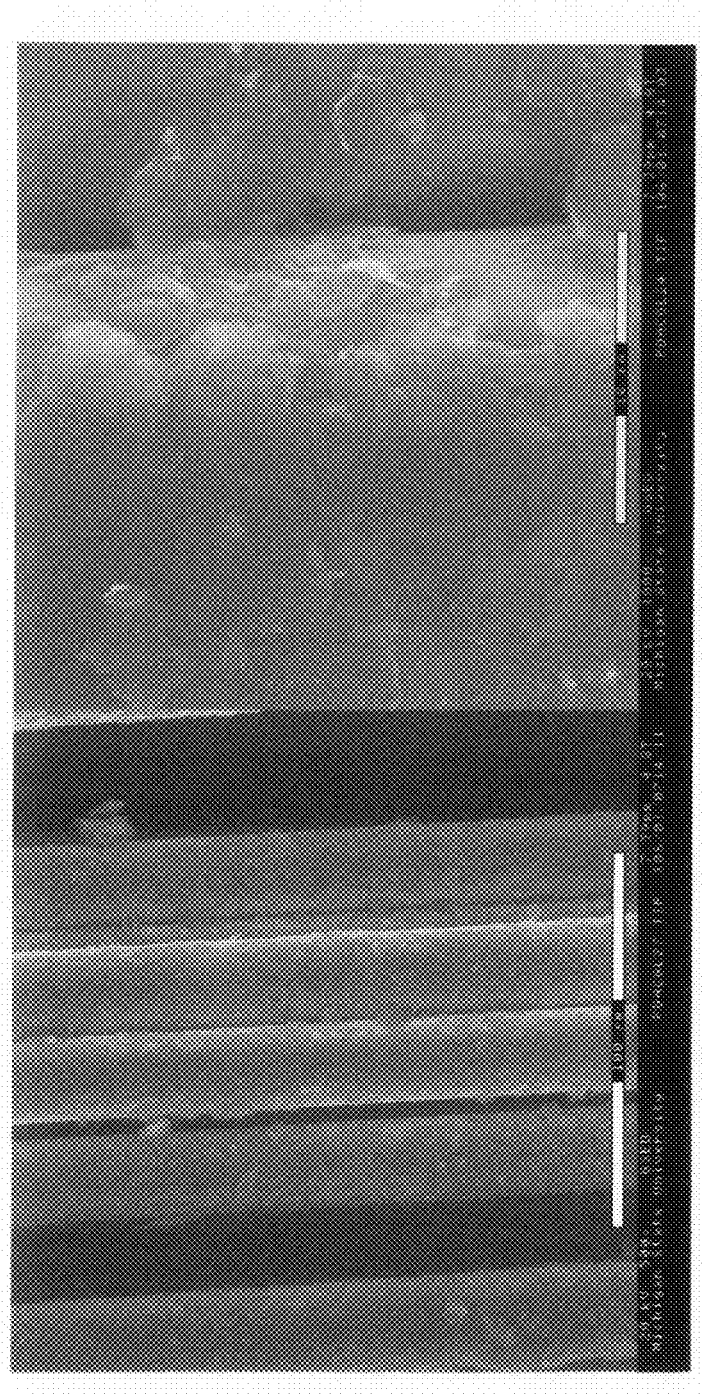
FIG. 15 is an ESEM image of a 1 wt % xGnP/PDAC coated glass fiber.
Figure 16:
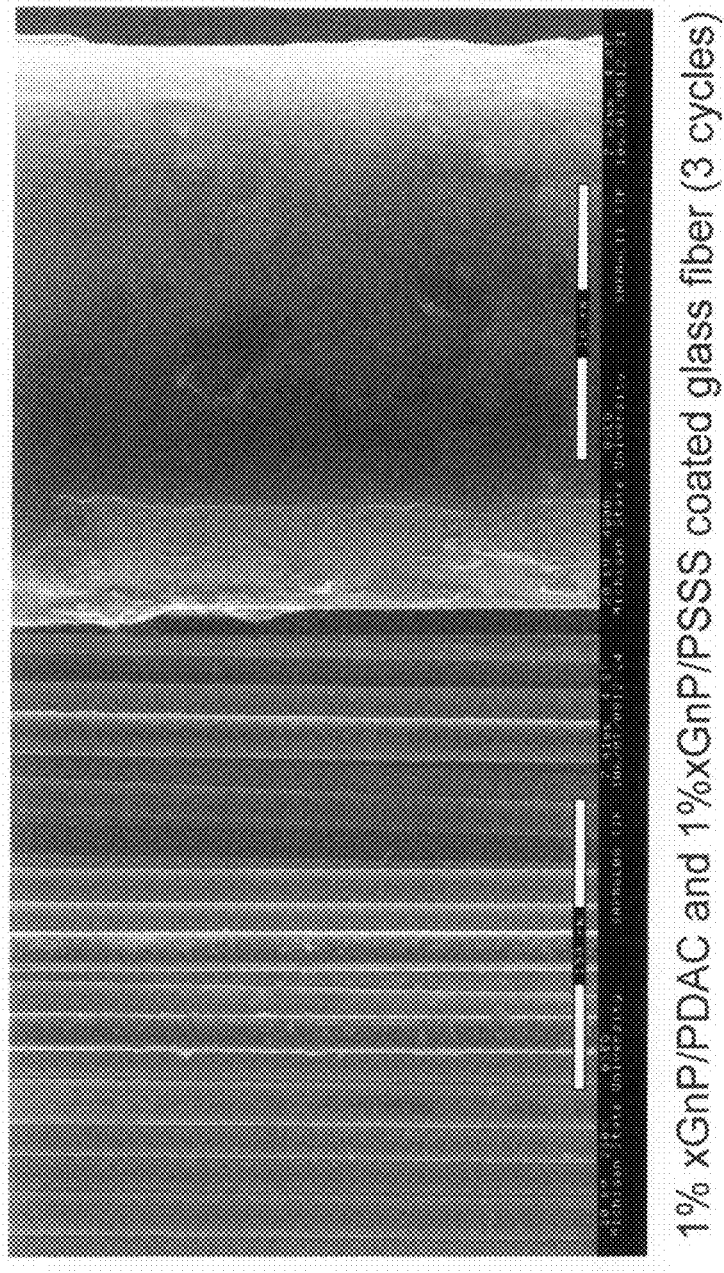
FIG. 16 is an ESEM image of a 1 wt % xGnP/PDAC and 1 wt % xGnP/PSSS coated glass fiber (3 cycles).
Figure 17:
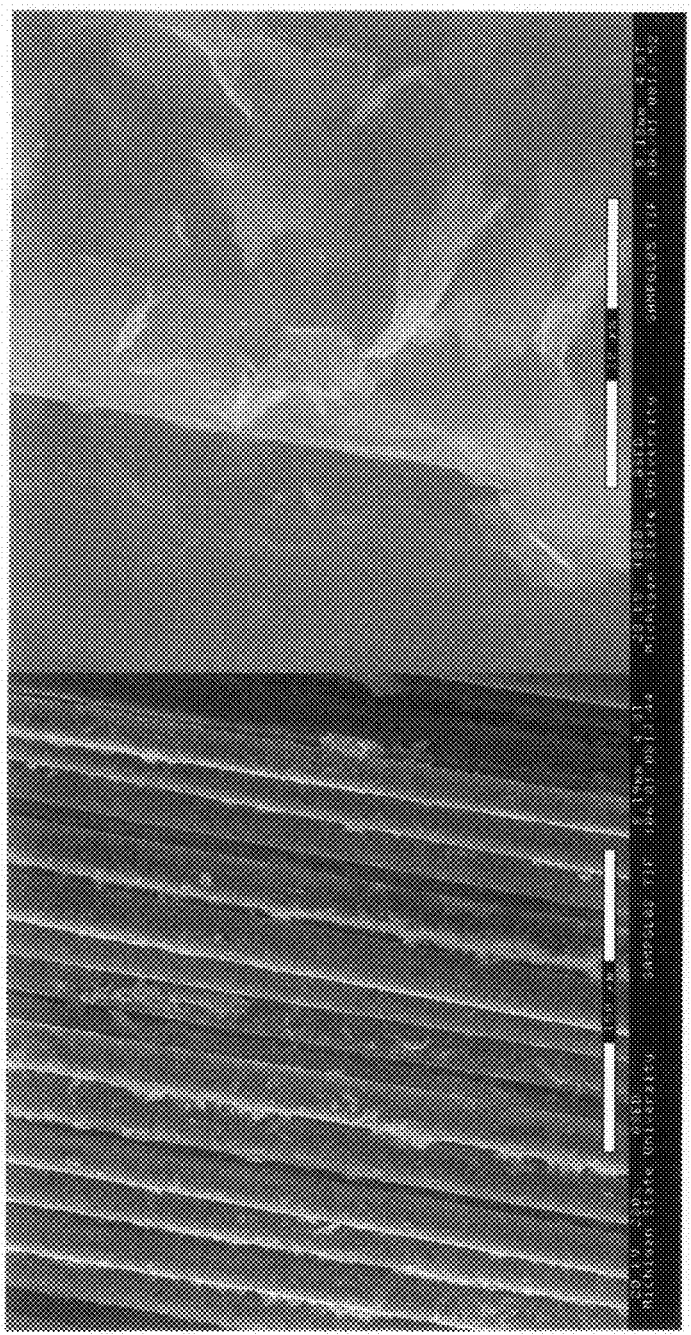
FIG. 17 is an ESEM image of a 1 wt % xGnP/PSSS and 1 wt % xGnP/PDAC coated glass fiber (3 cycles).

The ESEM images of 1.0 wt % xGnP water based solution are shown in FIG. 13 through FIG. 17. One weight percent (1.0 wt %) xGnP water based SDBS solution coated glass fiber produces a discontinuous coating of xGnP on glass fiber as shown in FIG. 13. This means that increasing only the xGnP content is not enough to reduce the resistivity of the glass fiber. More importantly, is the interaction between the water based solution and the glass fiber. One weight percent (1.0 wt %) xGnP water based PSSS solution coated glass fiber, as shown in FIG. 14, has many xGnP particles attached to the outer surface that form a continuous coating. This result explains why this fiber is conductive. Similarly, 1.0 wt % xGnP water-based PDAC solution, a 1.0 wt % xGnP/PDAC and 1.0 wt % xGnP/PSSS (3 cycle coating), and a 1.0 wt % xGnP/PSSS and 1.0 wt % xGnP/PDAC (3 cycle coating) graphite coated glass fibers, as illustrated in FIGS. 15 to 17, have a continuous xGnP coating on the glass fiber surface.

Figure 18:
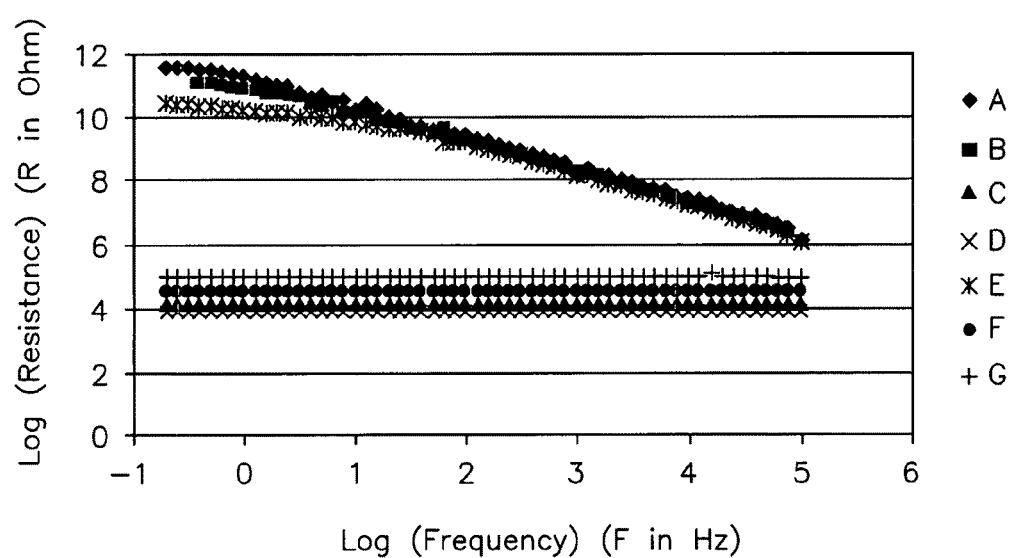
FIG. 18 is a graph illustrating the log (resistance) vs. log (frequency) of coated glass fibers. A=Raw glass fiber; B=1 wt % xGnP SDBS dipping coated glass fiber; C=1 wt % xGnP PSSS dipping coated glass fiber; D=1 wt % xGnP PDAC dipping coated glass fiber; E=1 wt % xGnP SDBS spray coated glass fiber; F=1 wt % xGnP PSSS spray coated glass fiber; G=1 wt % xGnP PDAC spray coated glass fiber.
Figure 19:
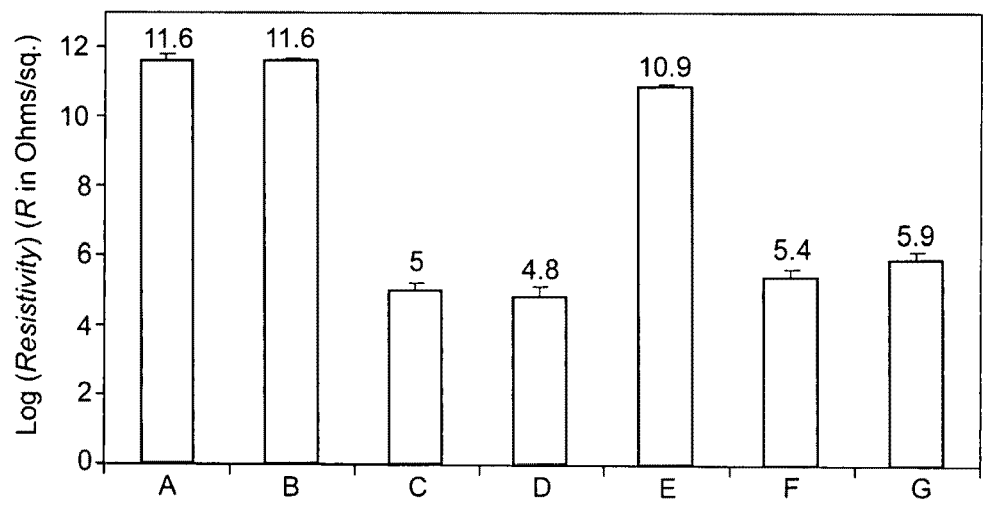
FIG. 19 is a histogram illustrating the log (resistivity) at 1 Hz of coated glass fibers. A=Raw glass fiber; B=1 wt % xGnP SDBS dipping coated glass fiber; C=1 wt % xGnP PSSS dipping coated glass fiber; D=1 wt % xGnP PDAC dipping coated glass fiber; E=1 wt % xGnP SDBS spray coated glass fiber; F=1 wt % xGnP PSSS spray coated glass fiber; G=1 wt % xGnP PDAC spray coated glass fiber.
Figure 20:
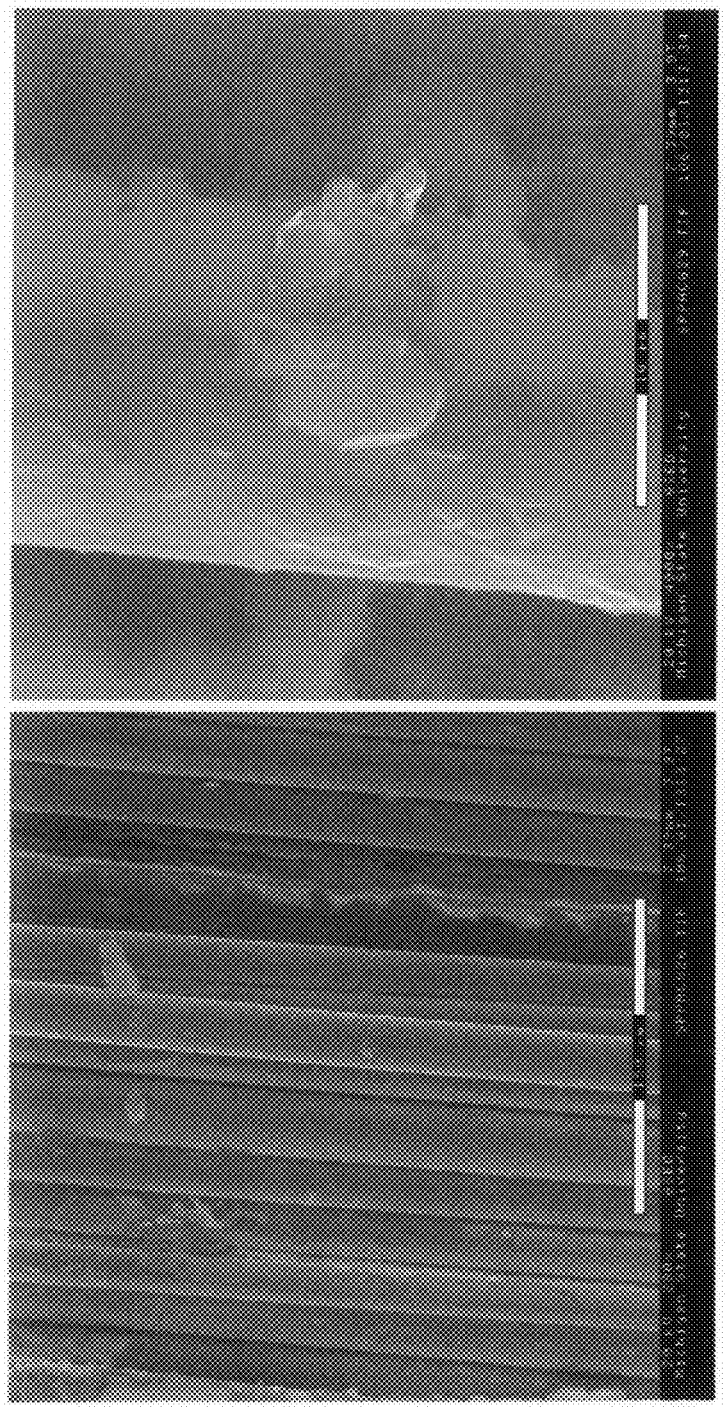
FIG. 20 is an ESEM image of a 1 wt % xGnP/PDAC coated glass fiber.
Figure 21:
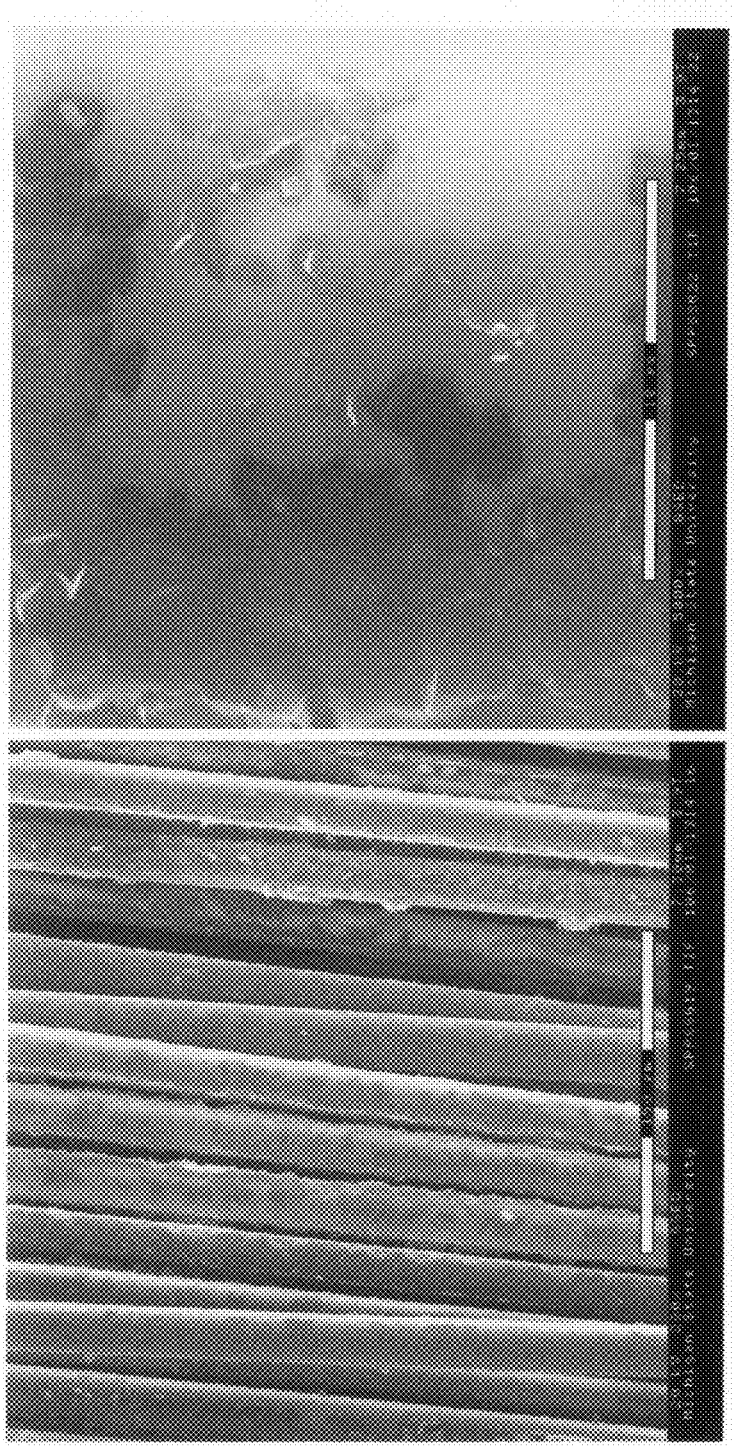
FIG. 21 is an ESEM image of a 1 wt % xGnP/PSSS coated glass fiber.

Dip coating on glass fiber surfaces does work well, so spray coating xGnP on glass fiber surface has also been investigated. Spray coating is an alternative coating process that can create an industrially more robust process. The AC impedance behavior and resistivity at 1 Hz of 1.0 wt % xGnP spray coated glass fibers is shown in FIGS. 18 and 19. It was found that a 1.0 wt % xGnP water-based PSSS and PDAC solution coating significantly reduced the resistance and resistivity of glass fiber. However, spray coating with a 1.0 wt % xGnP water based SDBS solution did not change the resistivity of glass fiber. This demonstrates that spray coating of xGnP onto glass fiber surfaces can produce a similar resistivity to that which is produced by dip coating xGnP of the glass fibers. The ESEM image of 1.0 wt % xGnP spray coated glass fiber, as illustrated in FIGS. 20 and 21, shows that graphite nanoplatelets clearly coat the entire glass fiber surface. The coating appears to be a homogenous coating on the glass fiber surface. This result suggests that the spray coating of the xGnP onto glass fiber surfaces can be used in an industrial application that can be directly inserted into the industrial production of glass fibers. Apparatuses and methods for coating elongated fibers are described in U.S. Pat. No. 5,042,111 to Iyer et al., U.S. Pat. No. 5,042,122 to Iyer et al., U.S. Pat. No. 5,102,690 to Iyer et al., U.S. Pat. No. 5,123,373 to Iyer et al., U.S. Pat. No. 5,138,199 to Iyer et al., U.S. Pat. No. 5,310,582 to Vyakarnam et al., U.S. Pat. No. 5,660,923 to Bieler et al., and U.S. Pat. No. 5,891,249 to Bieler et al., each of which are hereby incorporated herein by reference in its entirety.

The graphite used herein comprises exfoliated graphite nanoplatelets. We have assumed there is a thin layer of nanographite on the glass fiber surface. Through calculation, the weight fraction of xGnP on the glass fiber can be obtained. If we assume that: (1) the glass fiber is very long (L>>D); (2) the glass fiber has a smooth outer surface; (3) the nano-graphite is homogenous with thickness (T) of fifteen nanometers (15 nm) and has a size of on micron (1 μm); and (4) that the monolayer xGnP coating is formed on the outer surface of glass fiber, then the weight fraction of mono layer xGnP on the glass fiber is given by Equation 1.

$$W_{xGnP} \% = \frac{4 T_{xGnP} \rho_{xGnp}}{D_{glass} \rho_{glass}}. \qquad \text{Equation 1}$$

In Equation 1, WxGnP % is the weight fraction of xGnP on glass fiber surface, $T_{xGnP}$ is the thickness of graphite nanoplatelets, $\rho_{xGnP}$ is the density of graphite, $D_{glass}$ is the diameter of glass fiber, and $\rho_{glass}$ is the density of glass fiber. The densities of graphite and glass and diameter of glass fiber were 2.0 g/cm$^3$, 2.5 g/cm$^3$ and 20 μm, respectively. Thus, the theoretical weight fraction of monolayer xGnP coating on glass fiber is 0.2 wt %.

Figure 22:
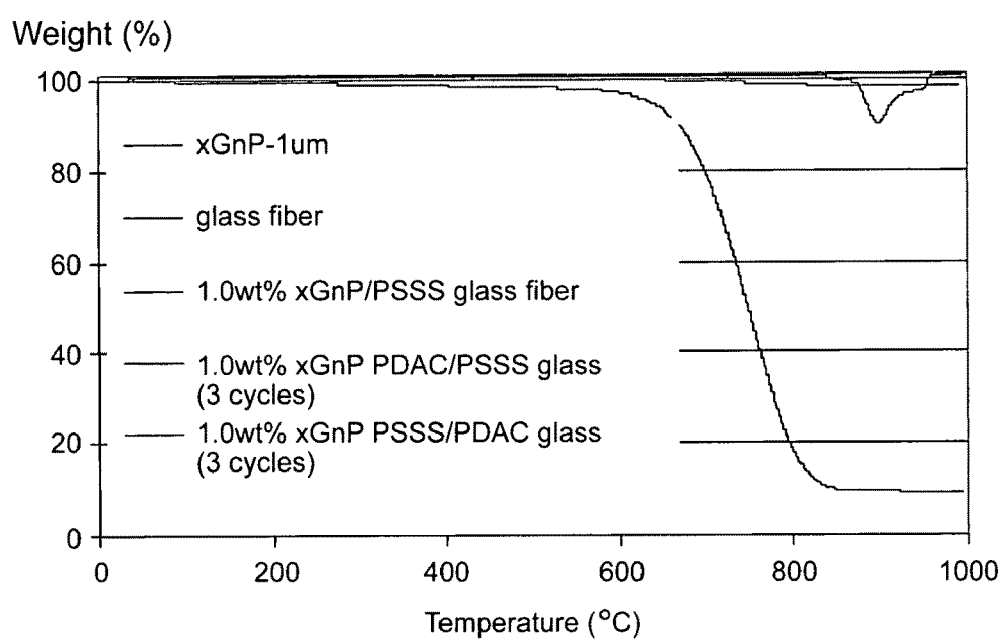
FIG. 22 is a plot of weight (%) vs. temperature (° C.) illustrating the TGA behavior of pure xGnP and xGnP coated glass fiber.
Figure 23:
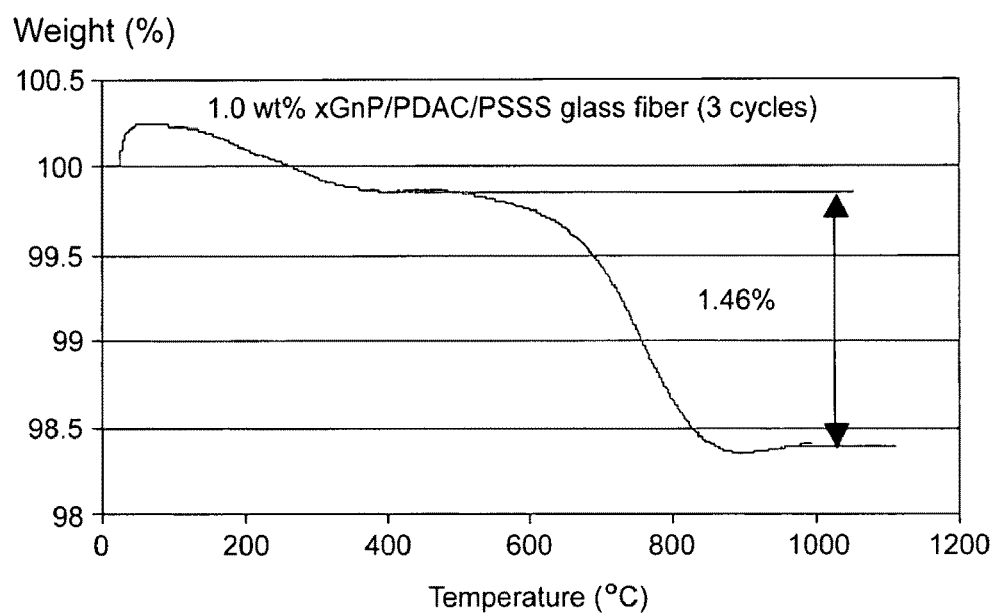
FIG. 23 is a plot of weight (%) vs. temperature (° C.) illustrating the TGA behavior of a 1.0 wt % xGnP/PDAC/PSSS coated glass fiber (3 cycles).

As a check, the weight percentage of xGnP on the glass fiber can be measured with a thermogravimetric analyzer (TGA). The thermogravimetric behavior of pure xGnP and xGnP coated glass fiber is shown in FIGS. 22 and 23. The pure xGnP starts to decompose around 600° C. and finishes around 860° C. under flowing air. By using this method, the single layer xGnP coating had a weight fraction of 0.16-0.23% on the glass fiber surface. The three cycle (six layer) xGnP coating had weight fraction of 1.5% on glass fiber surface (FIG. 23). This is consistent with the value of theoretical calculations, which indicates that the coating condition here used is really close to optimized condition.

Figure 24:
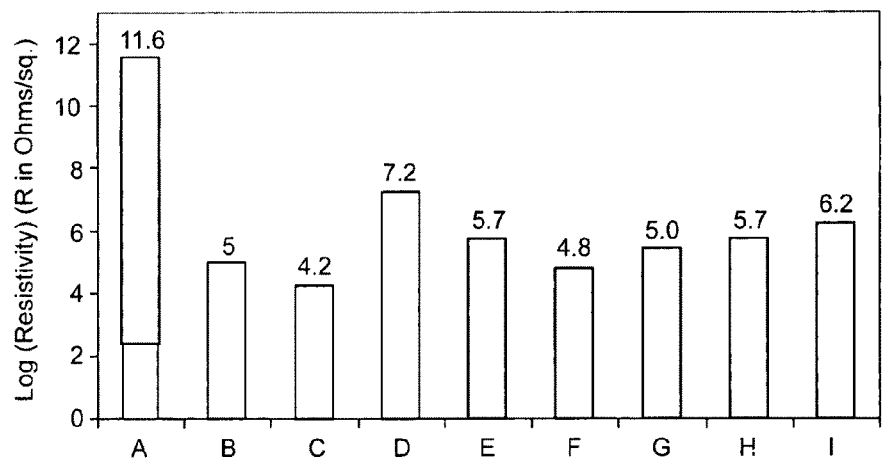
FIG. 24 is a histogram illustrating the log (resistivity) at 1 Hz of multiple layer coated glass fibers. A=Raw glass fiber; B=1% xGnP PSSS coated glass fiber; C=1% xGnP PDAC/PSSS coated glass fiber 1 cycles; D=1% xGnP PDAC/PSSS coated glass fiber 3 cycles; E=1% xGnP PDAC/PSSS coated glass fiber 5 cycles; F=1% xGnP PDAC coated glass fiber; G=1% xGnP PSSS/PDAC coated glass fiber 1 cycles; H=1% xGnP PSSS/PDAC coated glass fiber 3 cycles; I=1% xGnP PSSS/PDAC coated glass fiber 5 cycles.

Comparing the resistivity of one layer and multiple layer coated glass fibers, as shown in FIG. 24, it appears that more than two layers coating is not helpful to produce reduced resistivity. A two layer coating is enough to get a highly conductive glass fiber. This may due to the fact that polyelectrolyte stays in between layers and hence blocks the movement of electrons from one layer xGnP to another layer of xGnP because the polyelectrolyte is not conductive. The role of polyelectrolyte is to interact with fiber through electrostatic interaction and penetrate to the xGnP to keep the xGnP solution stable. Use of a conductive polymer binder or film former can be used to improve the conductivity.

Based on the above results, the xGnP coating shows promising results in improving the conductive properties of the glass fibers. Glass fibers can be quickly and conveniently coated with conductive, exfoliated nanographite platelets (xGnP) through a variety of means described herein, so that the glass fibers exhibit acceptable levels of electrical conductivity. As a result of our work the following conclusions can be made. First, xGnP can be coated on the surface of glass fiber with a variety of methods and chemical processes, such as dipping the glass fiber into a water based suspension of a polyelectrolyte with xGnP, and spraying the water based suspension of a polyelectrolyte with xGnP. Second, the electrical resistance of the glass fiber was reduced to levels that made the graphite coated glass fiber conductive enough for electrostatic spraying, and this conductivity depends on the concentration of graphite and polyelectrolyte. Third, one layer coating is more effective and can result in better conductivity than multi-layer coating of xGnP. Fourth, the amount of coated graphite on the glass fibers with the best conductivity is only about 0.16 weight percent to about 0.2 weight percent (wt %).

The current invention particularly relates to making conductive SMC composite with carbon based nanomaterials especially with exfoliated graphite nanoplatelets (xGnP) using plastic processing methods such as sheet molding compound (SMC) and compression molding. The composite from SMC will have excellent electrical conductivity with low levels of xGnP in the composites yet produce a SMC composite with enhanced electrostatic discharge (ESD) and electro magnetic interference (EMI) shielding properties. The example SMC composite material is composed of xGnP coated glass fibers, xGnP coated calcium carbonate, and optionally xGnP dispersed in the unsaturated polyester resin. However, this approach could be used with any SMC or composite formulation where a base system (polyester, vinylester, epoxy, phenolic or polyimide), reinforcements (fiberglass, graphite, aramid), and additives that include inert fillers, pigments, UV stabilizers, catalysts, inhibitors, and thickeners are combined. This approach could also be used with water based resins. The compression molded conductive composites possess superior mechanical properties that benefit the use of this material in many automotive, aerospace, defense and durable goods applications.

Example 1

Controlled Spray Coating of Glass Fiber Bundle with xGnP-1

Figure 25:
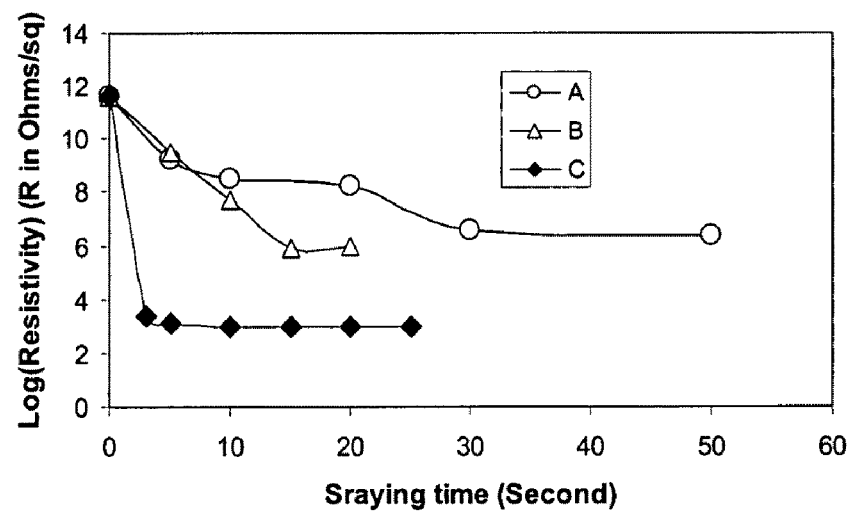
FIG. 25 is a graph showing the surface resistivity of xGnP-1 coated glass fiber as function of spraying time for (A), 1% xGnP PSSS spray-coated glass fiber with 12 ml/min rate, (B), 1% xGnP PSSS spray-coated glass fiber with 20 ml/min rate, and (C), 5% xGnP PSSS spray-coated glass fiber with 20 ml/min rate.
Figure 26:
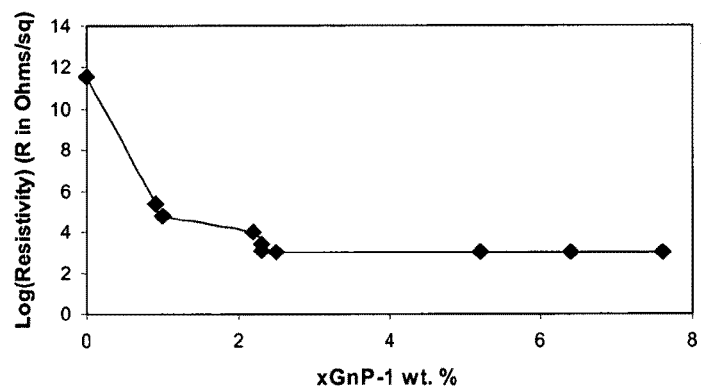
FIG. 26 is a graph showing the surface resistivity of coated glass fiber bundle vs. the weight fraction of xGnP-1 on fiber surface.
Figures 27A, 27B, 27C, 27D, 27E, 27F:
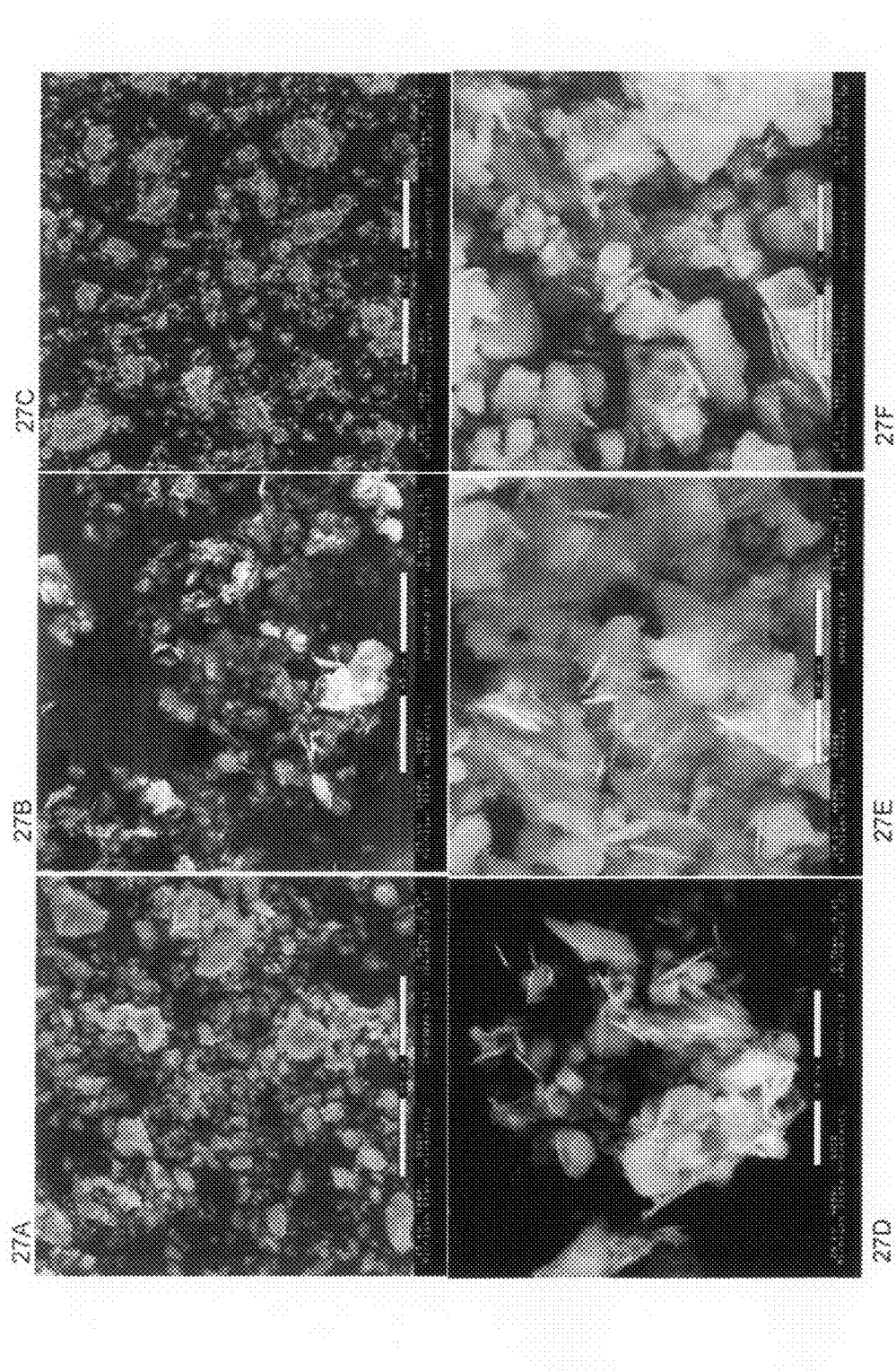
FIGS. 27A to 27F are ESEM images of (27A), $CaCO_3$, (27B), 7% xGnP-1 coated $CaCO_3$, (27C), 10% xGnP-1 with PSSS coated $CaCO_3$, (27D), 10% xGnP-1 with PSMA coated $CaCO_3$, (27E), 7% xGnP-1 with PSMA coated $CaCO_3$, and (27F), 5% xGnP-1 with PSMA coated $CaCO_3$.

Spray coating parameters such as concentration of xGnP™ in suspension, spray rate and spray time are important to control the electrical resistivity of a coated glass fiber bundle. The surface resistivity is reduced with increasing spray rate and spray time as well as concentration of xGnP™ in water based suspension (as shown in FIG. 25). With increasing spray time, the surface resistivity was reduced and then levels off. With 5 wt % xGnP™/PSSS suspension spray coating, the resistivity of coated fiber almost does not change with spray time. This implies that the there is a concentration threshold beyond which additional amounts of xGnP do not add to the electrical conductivity. Actually, the resistivity is related to the amounts of xGnP™ on glass fiber surface (FIG. 26). Once above the threshold of 2.5 wt %, the resistivity does not change with concentration.

Example 2

Coating of Calcium Carbonate with xGnP-1

Calcium carbonate, talc and other inorganic ceramic fillers are the most popular fillers to reinforce polymers in order to reduce the cost and increase the stiffness since most of these inorganic fillers have low cost and high stiffness. Coating carbon based nano-materials on the surface of these ceramic fillers can make fillers that have more functionality such as electrical properties, magnetic properties, and spectral response in reinforced composite system. The coating of inorganic fillers such as calcium carbonate with xGnP involves using a binder to form xGnP solvent based suspension and polyelectrolytes to form water based xGnP solution. Binders used here include block, graft and alternative copolymers that can interact with both fillers and carbon based nanomaterials. Poly(styrene-co-maleic anhydride) is an example here for coating xGnP on the surface of $CaCO_3$. The filler was slowly added to the solution and suspension under stirring for stirring sometime. The digital and ESEM images of these coated $CaCO_3$ are shown in FIGS. 27A to 27F. It was found that the coating conditions could be varied between $CaCO_3$ with 10% xGnP with PSMA as binder in an acetone system or $CaCO_3$ with xGnP and PSSS in a water system.

Example 3 xGnP Reinforced Unsaturated Polyester Composite

Figure 28:
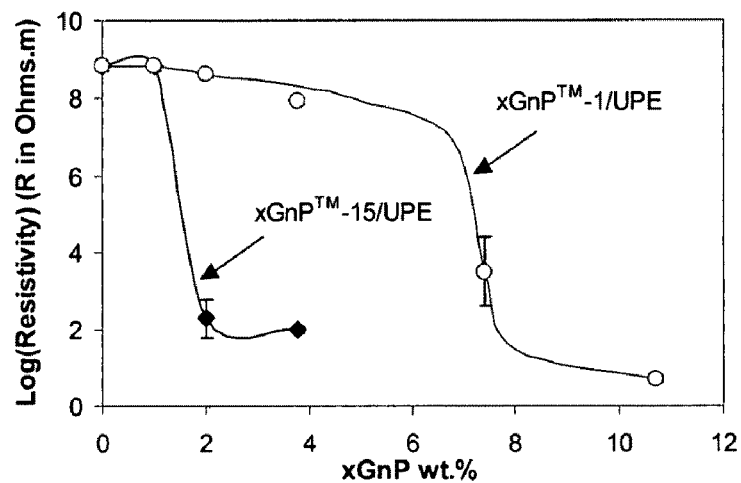
FIG. 28 is a graph showing the plot of resistivity of xGnP™/UPE composite vs. xGnP™ wt %.

The resistivity of xGnP™ reinforced polyester composites vs. the wt. % of xGnP™ is shown in FIG. 28. The percolation threshold for achieving conductive composite is around 2 wt. % for xGnP™-15 and 8 wt. % for xGnP™-1, which is related to the aspect ratio of the xGnP (xGnP-1 means a mean diameter of about 1 micron while xGnP-15 means a mean diameter of about 15 microns). Since xGnP™-15 has a 15 times higher aspect ratio than xGnP™-1 that leads to good contact between nanoplatelets at lower concentration.

TABLE 2

Mechanical properties of xGnP reinforced unsaturated polyester composite.

| Sample | xGnP ™-1 content (%) | xGnP ™-15 content (%) | Flexural strength (MPa) | Flexural modulus (GPa) | Impact strength (J/m) |
|---|---|---|---|---|---|
| A | 0 | 0 | 49 | 2.1 | 14.4 |
| B | 0 | 1 | 46 | 2.4 | 11.3 |
| C | 0 | 2 | 41 | 2.7 | 11.5 |
| D | 0 | 4 | 35 | 3.0 | 11.1 |
| E | 1 | 0 | 45 | 2.3 | 11.8 |
| F | 2 | 0 | 45 | 2.4 | 11.6 |
| G | 4 | 0 | 39 | 2.5 | 11.6 |

The mechanical properties of these xGnP™ reinforced composites is shown in Table 2. The modulus increased with increases in xGnP™ in the composite. The strength reduced slightly with increasing the content of xGnP™. It was also found that the xGnP™-15 is more effective in increasing the stiffness of it reinforced UPE composite. This may be due to the fact that xGnP™-15 has higher aspect ratio. The impact strength of xGnP™ reinforced composite was reduced slightly, which is pretty common in nanoparticle reinforced thermoset composite.

Example 4 xGnP™/$CaCO_3$ Reinforced UPE Composite

TABLE 3

Mechanical properties of xGnP reinforced unsaturated polyester composite.

| Sample | CaCO3 content (%) | xGnP ™-15 content (%) | Flexural strength (MPa) | Flexural modulus (GPa) | Impact strength (J/m) |
|---|---|---|---|---|---|
| A | 0 | 0 | 49 | 2.1 | 14.4 |
| B | 0 | 1 | 46 | 2.4 | 11.3 |
| C | 0 | 2 | 41 | 2.7 | 11.5 |
| D | 30 | 0 | 50 | 3.5 | 14.1 |
| E | 30 | 0.7 | 46 | 3.7 | 14.4 |
| F | 30 | 1.4 | 42 | 3.9 | 14.1 |
| G | 30 | 2.0 | 39 | 4.1 | 14.3 |
| H | 50 | 0 | 47 | 4.9 | 15.8 |
| I | 50 | 1 | 39 | 5.4 | 16.1 |
| J | 50 | 2 | 43 | 5.6 | 16.2 |

The mechanical properties of xGnP™/$CaCO_3$ reinforced UPE composite (without glass fiber) is shown Table 3. It was found that the stiffness was significantly enhanced after addition of $CaCO_3$. However, the composite decreases in strength. The other important feature is that in this case, the addition of $CaCO_3$ obviously increased the impact strength of the composite.

Figure 29:
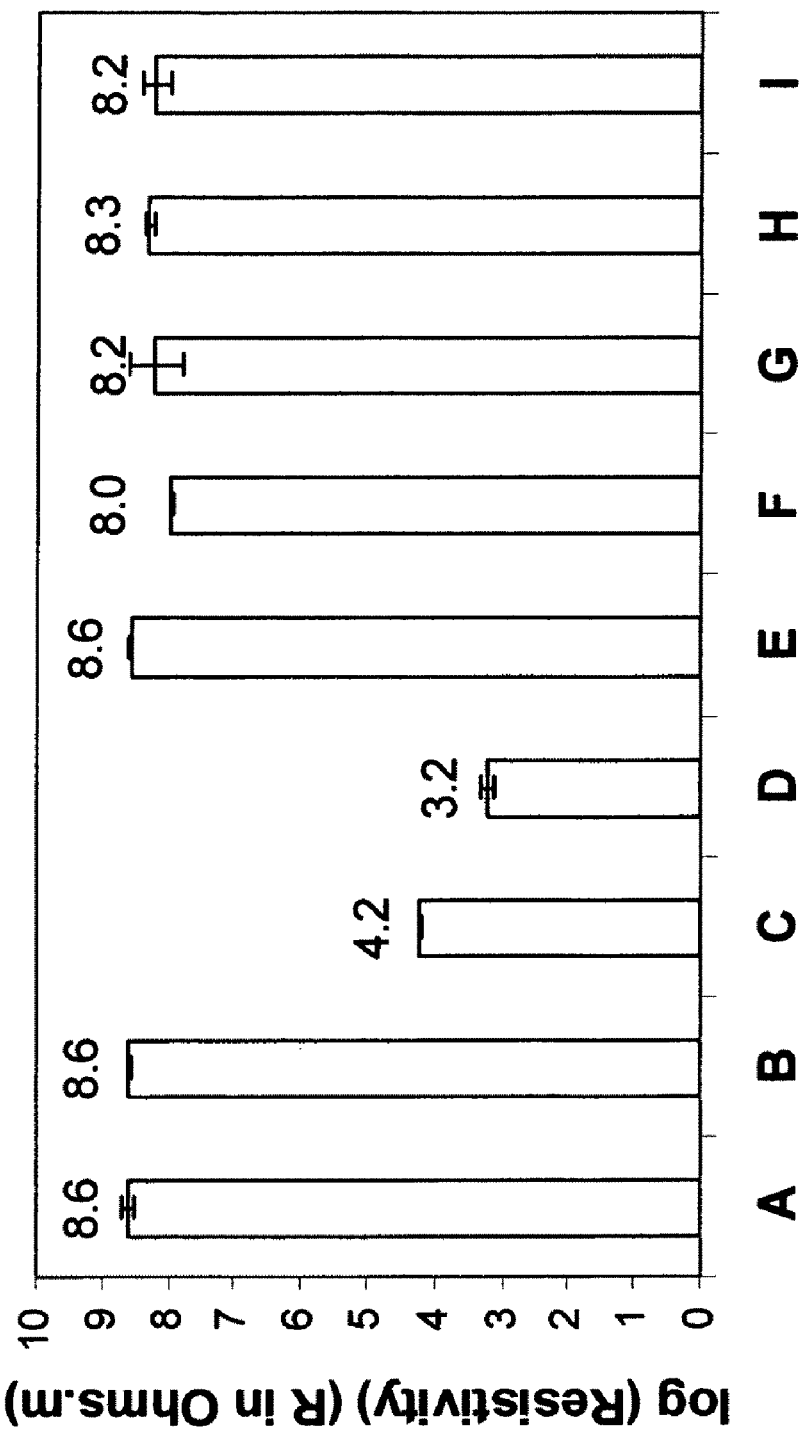
FIG. 29 is a bar graph showing the resistivity of xGnP™-15/$CaCO_3$/UPE composite for (A), UPE, (B), 1 wt. % xGnP™-15/UPE, (C), 2 wt. % xGnP™-15/UPE, (D), 4 wt. % xGnP™-15/UPE, (E), 0.7 wt. % xGnP™-15/30% CaCO3/UPE, (F), 1.4 wt. % xGnP™-15/30% $CaCO_3$/UPE, (G), 2.0 wt. % xGnP™-15/30% $CaCO_3$/UPE, (H), 1.0 wt. % xGnP™-15/50% CaCO3/UPE, and (I), 2.0 wt. % xGnP™-15/50% CaCO3/UPE.

The resistivity of xGnP™/$CaCO_3$/UPE composites is shown FIG. 29. Compared with xGnP™/UPE composite, the composites are not conductive after the addition of $CaCO_3$, which indicates that $CaCO_3$ interrupted the percolated network of xGnP™ formed in the composite and thereby reduced the conductivity. Even adding higher content of xGnP™, the composite is still non-conductive. In order to produce a conductive composite, the coating of $CaCO_3$ with xGnP™ is necessary.

Example 5

Resistivity of xGnP™ Coated $CaCO_3$/UPE (xGnP™) Composite

TABLE 4

The resistivity (R) of coated $CaCO_3$/unsaturated polyester (UPE) composite.

| No. | CaCO3 phase (%) | xGnP ™-1 on CaCO3 (%) | UPE phase (%) | xGnP ™-15 in UPE (%) | xGnP ™ in composite (%) | Log (R) (R in Ohms · m) |
|---|---|---|---|---|---|---|
| 1 | 0 | 0 | 100 | 0 | 0 | 8.8 |
| 2 | 0 | 0 | 100 | 2.0 | 2.0 | 2.3 |
| 3 | 0 | 0 | 100 | 4.0 | 4.0 | 2.0 |
| 4 | 0 | 0 | 100 | 4 (xGnP ™-1) | 4.0 | 7.9 |
| 5 | 0 | 0 | 100 | 8 (xGnP ™-1) | 8.0 | 3.5 |
| 6 | 29 | 0 | 71 | 5.6 | 4.0 | 7.6 |
| 7 | 30 | 5 | 70 | 2.9 | 3.5 | 8.7 |
| 8 | 30 | 7 | 70 | 1.3 | 3.0 | 8.4 |
| 9 | 30 | 7 | 70 | 1.7 | 3.3 | 1.2 |
| 10 | 29 | 7 | 71 | 2.8 | 4.0 | 1.2 |
| 11 | 29 | 7 | 71 | 5.5 | 5.9 | 0.3 |
| 12 | 40 | 7 | 60 | 0 | 2.8 | 8.8 |
| 13 | 50 | 7 | 50 | 0 | 3.5 | 2.6 |
| 14 | 50 | 10 | 50 | 0 | 5.0 | 0.9 |

TABLE 4-continued

The resistivity (R) of coated CaCO₃/unsaturated polyester (UPE) composite.

| No. | CaCO3 phase (%) | xGnP ™-1 on CaCO3 (%) | UPE phase (%) | xGnP ™-15 in UPE (%) | xGnP ™ in composite (%) | Log (R) (R in Ohms · m) |
|---|---|---|---|---|---|---|
| 15 | 30 | 10 | 70 | 0 | 3.0 | 8.5 |
| 16 | 30 | 10 | 70 | 0.7 | 3.2 | 2.8 |
| 17 | 30 | 10 | 70 | 1.0 | 3.4 | 2.6 |
| 18 | 30 | 10 | 70 | 1.4 | 3.7 | 1.9 |

The resistivity of CaCO₃/UPE composite with xGnP™ is shown in Table 4. It was found that simple mixed of xGnP™ into the CaCO₃/UPE composite even at 4 wt. % of xGnP™ did not increase the conductivity of the composite. However, when CaCO₃ was coated with 7 or 10 wt. % xGnP™, a composite containing 50 wt % coated CaCO₃ was fully conductive. For the 30 wt % coated CaCO₃ reinforced composite, it is necessary to mix xGnP™-15 in the UPE phase to achieve a fully conductive composite. This is due to fact that xGnP™-1 on the surface of CaCO₃ is not enough to achieve a conductive network and extra xGnP™-15 is required to form the conductive network. For 10 wt % xGnP™ coated CaCO₃, the minimum content of xGnP™ to achieve conductive composite containing 30% coated CaCO₃ and UPE is around 3.2 wt %. Similarly, for 7 wt % xGnP™ coated CaCO₃, the minimum content of xGnP™ to achieve conductive composite is around 3.5 wt %. However, for 5 wt % xGnP™ coated CaCO₃, with a total xGnP™ content of 3.5 wt %, the composite is not conductive. These results indicate that the percolation threshold for conductivity shifts to lower values with increasing content of xGnP™ on the CaCO₃ surface. In addition, the results indicate that there is a minimum content of binder on the surface of CaCO₃ is good to achieve higher conductivity.

Example 6

Resistivity of Glass Fiber/Coated CaCO₃/UPE Composite

The impedance behavior of a 28% glass fiber/47% CaCO₃/UPE composite is shown in FIG. 30. As expected, it was found that glass fiber/CaCO₃/UPE composite without xGnP™ was not conductive. These composites containing xGnP™ coated glass fiber/CaCO₃/UPE are still not conductive because the amount of xGnP™ on glass fiber is only 0.8 wt % and 1 wt %. Therefore the total xGnP™ content in the composite is below 0.3 wt %. The bare glass fiber/xGnP™-coated CaCO₃/UPE composite with 1 wt. % xGnP™ showed decreases in impedance with decreasing frequency and approached a constant value of log 6. This is good for electrostatic painting. With further increases in xGnP™ content on CaCO₃ in the composite, the impedance value again was reduced. Once a value of 2 wt % xGnP™ was achieved in the composite, the impedance value did not change even after increasing it to 3.3 wt % and 3.8 wt % xGnP™ in the composite.

Figure 32:
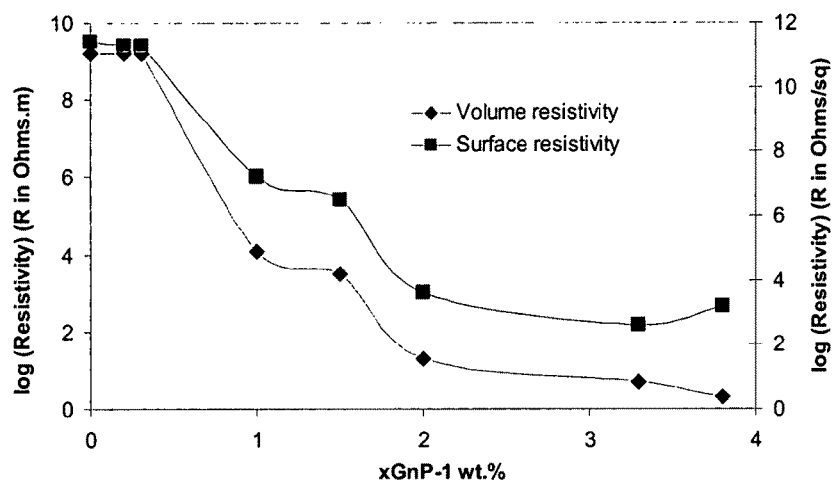
FIG. 32 is a graph showing the plot of resistivity vs. xGnP™-1 wt % of glass fiber/$CaCO_3$/UPE composite.

The directional volume resistivity of a 28% glass fiber/47% CaCO₃/UPE is shown in FIG. 31. It was found that the volume resistivity is almost same in the thickness and surface direction. This further indicates that the dispersion of xGnP™ in the composite is uniform. The resistivity of these composites vs. the content of xGnP™ in the composite is shown in FIG. 32. It is obvious that the conductive percolation threshold is around 1-2 wt. % xGnP™ in the composite. When the xGnP™ content is 1 wt %, the surface resistivity is around 10⁷ Ohms/sq., which is good for electrostatic painting. When the content of xGnP™ is above 2 wt %, the composite is much more conductive, which makes it potentially useful for many different electrical, magnetic and other applications.

Example 7

Mechanical Properties of Glass Fiber/Coated CaCO₃/UPE Composite

Figure 33A:
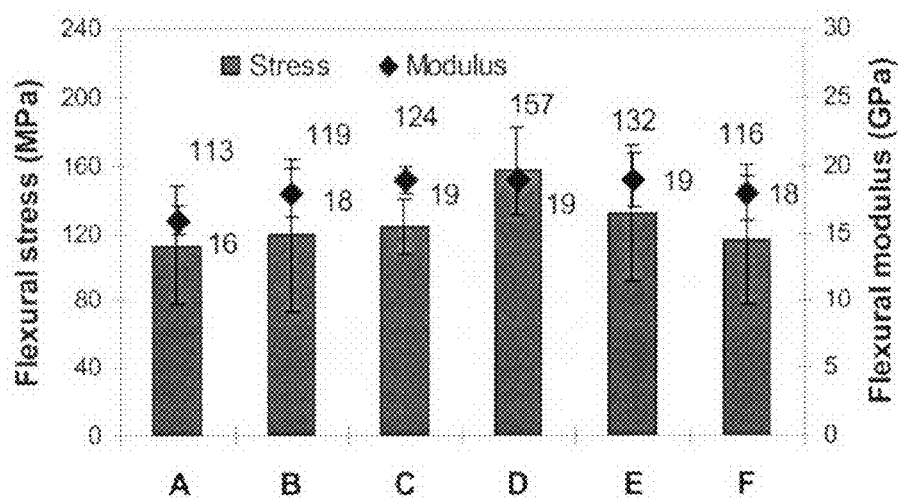
FIGS. 33A and 33B are bar graphs showing flexural properties and notched Izod impact strength, respectively of glass fiber/CaCO3/UPE composite.
Figure 33B:
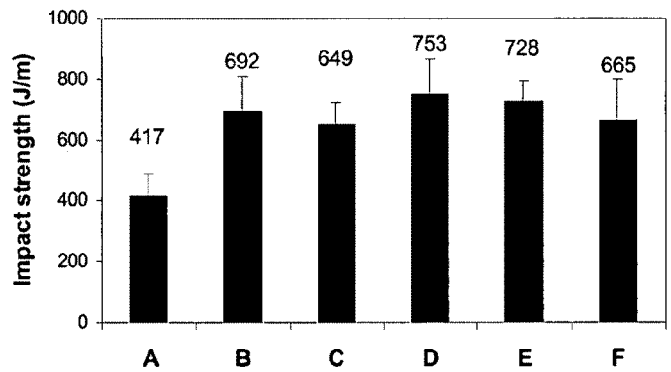

The mechanical properties of 28% glass fiber/47% CaCO₃/UPE SMC composites are shown in FIG. 33. It was found that glass fiber/CaCO₃/UPE composite had increases in both flexural modulus (~20%) and strength (~40%) with xGnP™ additions. This indicates that xGnP™ coated fiber or filler in the composite have a positive effect on the mechanical properties of the composite. In addition, the impact strength increased (~80%) with xGnP™ coated fiber or filler in the composite, which also benefits the use of this material in many automotive aerospace, defense and durable goods applications.

The present invention thus provides a method to fabricate glass fiber/calcium carbonate/unsaturated polyester resin composites with certain conductivity utilizing the unique properties of exfoliated graphite nanoplatelets (xGnP). Fibers and/or fillers were coated with carbon based nanomaterials such as exfoliated graphite nanoplatelets (xGnP). The coated fiber and/or filler reinforced unsaturated polyester hybrid composites can be made with conventional industrial processing methods such as sheet molding compound (SMC) and compression molding. The approach described here can be applied to any composite system consisting of resin, fibers and/or fillers to produce a conductive composite material.

Sheet molding compound, compression molding, electrically conductive composites, carbon based nano-materials, exfoliated graphite nanoplatelet (xGnP), unsaturated polyester, glass fiber, ceramic fiber, cellulose based fiber, carbon fiber, carbon nanotube, polyelectrolyte, electrical properties, mechanical properties, inorganic filler, binder, calcium carbonate.

Since carbon based nano-materials such as xGnP has excellent electrical properties, it can be used to conduct electrically conductive composites for structural and non-structural application. The current invention is unique in the sense that a process of sheet molding compound with carbon-based nano-materials, glass fiber, fillers and resins to make pre-made semi-consolidated sheet material and further make conductive composite that will have functionality in special application such as automotive panel electrostatic painting. In addition, carbon based nanomaterials reinforced hybrid composites possess great potential for multi-functional application due to carbon based nanomaterials having special electrical-chemical and spectrum response.

Glass fiber/calcium carbonate/unsaturated polyester conductive SMC composite materials were prepared utilizing the selective addition of exfoliated graphite nanoplatelets to the surface of the SMC composite constituents. The results were completed and shown in Table 5.

TABLE 5

The resistivity of glass fiber/CaCO$_3$/xGnP/UPE hybrid composite.

| No. | Glass fiber phase (%) | xGnP ™-1 on glass (%) | CaCO$_3$ phase (%) | xGnP ™-1 on CaCO3 (%) | UPE phase (%) | xGnP ™-15 in UPE (%) | xGnP ™ in composite (%) | Log (R) (R in Ohms · m) |
|---|---|---|---|---|---|---|---|---|
| 1 | 0 | 0 | 0 | 0 | 100 | 0 | 0 | 8.8 |
| 2 | 0 | 0 | 0 | 0 | 100 | 2.0 | 2.0 | 2.3 |
| 3 |   |   | 0 | 0 | 100 | 8.0 | 8.0 | 3.5 |
| 4 | 0 | 0 | 29 | 0 | 71 | 5.6 | 4.0 | 7.6 |
| 5 | 0 | 0 | 30 | 7 | 70 | 1.3 | 3.0 | 8.4 |
| 6 | 0 | 0 | 30 | 7 | 70 | 1.7 | 3.3 | 1.2 |
| 7 | 0 | 0 | 30 | 10 | 70 | 0.7 | 3.2 | 2.8 |
| 8 | 0 | 0 | 50 | 7 | 50 | 0 | 3.5 | 2.6 |
| 9 | 0 | 0 | 50 | 10 | 50 | 0 | 5.0 | 0.9 |
| 10 | 28 | 0 | 47 | 0 | 23 | 0 | 0 | 8.8 |
| 11 | 28 | 1.0 | 47 | 0 | 23 | 0 | 0.3 | 8.7 |
| 12 | 28 | 0 | 47 | 2.1 | 23 | 0 | 1.0 | 5.1 |
| 13 | 28 | 0 | 47 | 3.2 | 23 | 0 | 1.5 | 3.8 |
| 14 | 28 | 0 | 47 | 4.3 | 23 | 0 | 2.0 | 0.7 |
| 15 | 28 | 0 | 38 | 10 | 29 | 0 | 3.8 | 0.3 |

The methods to produce the conductive composites include common plastic processing methods especially with sheet molding compounding and compression molding. The amount of xGnP required to make the SMC formulations conductive is around 1.5 wt % of xGnP. The surface resistivity of the composite having 1 wt. % xGnP™-1 is $10^7$ Ohms/sq., which is very promising for electrostatic painting. In addition, these composite having SMC composition had increases in both flexural modulus (~20%) and strength (~40%) with xGnP™ additions. The impact strength also increased (~80%) with xGnP™ coated fiber and/or filler in the composite, which also benefits the use of this material in many automotive aerospace, defense and durable goods applications. The use of xGnP in combination with this method of applying the xGnP to the composite constituents can be applied to any resin/fiber/filler composite formulation to produce superior electrical conductivity along with enhance mechanical properties.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the Claims attached herein.

We claim:

1. A reinforced composite material which comprises:
   (a) polymeric matrix in admixture with a plurality of graphite coated fibers mixed in the polymeric matrix, the fiber having a high resistivity and having an outer surface, and exfoliated and pulverized platelets of the graphite having a particle size between about 0.1 and 500 microns coated on the outer surface of the fiber; and
   (b) high resistivity particles coated with the graphite platelets in the polymer matrix, wherein the reinforced composite material enables electrostatic painting.

2. The reinforced composite material of claim 1, wherein the fibers comprise glass fibers.

3. The reinforced composite material of claim 2, wherein the weight fraction of the platelets on the outer surface of the glass fibers is from about 0.01 wt % to about 15 wt % of the weight of the fibers and on the outer surface of the particles is from about 0.05 to 20% of the weight of the particles.

4. The reinforced composite material of claim 1, wherein the fibers comprise polymer fibers.

5. The reinforced composite material of claim 1, wherein the polymeric matrix comprises a thermoset or thermoplastic organic polymer.

6. The composite material of any one of claim 1, 2, 3, 4 or 5 wherein the particles are calcium carbonate particles.

7. The composite material of any one of claim 1, 2, 3, 4 or 5 wherein the fibers are as a bundle of fibers.

8. The composite material of any one of claim 1, 2, 3, 4 or 5 wherein the fibers are as a bundle of fibers and the particles are calcium carbonate.

9. The composite material of any one of claim 1, 2, 3, 4 or 5 wherein the composite is as a sheet molding composition with the fibers which are chopped in the polymer matrix.

10. The composite material of any one of claim 1, 2, 3, 4 or 5 wherein the fibers are distributed throughout the polymer matrix.

11. A method of electrostatic painting a reinforced composite material without using a conductive primer comprising the steps of:
   (a) providing a reinforced composite material which comprises a polymeric matrix in admixture with a plurality of graphite coated fibers mixed in the polymeric matrix comprising the fibers having a high resistivity and having an outer surface, and exfoliated and pulverized platelets of the graphite having a particle size between about 0.1 and 500 microns coated on the outer surface of the fiber; and high resistivity particles coated with the graphite platelets;
   (b) electrically grounding the reinforced composite material;
   (c) providing a charged powder comprising a resin and a pigment;
   (d) spraying the charged powder onto the electrically grounded reinforced composite material so as to coat the material; and (e) curing the powder on the reinforced composite material in a curing oven, so as to electrostatically paint the reinforced composite material with the powder.

12. The method of claim 11, wherein the fibers are glass fibers.

13. The method of claim 12, wherein the weight fraction of the platelets on the outer surface of the glass fibers is from about 0.01 wt % to about 15 wt % of the weight of the fibers and on the outer surface of the particles is from about 0.05 to 20% of the weight of the particles.

14. The method of claim 11, wherein the fibers comprise polymer fibers.

15. The method of claim 11, wherein the polymeric matrix comprises a thermoset or thermoplastic organic polymer.

16. The method of any one of claim 11, 12, 13, 14 or 15 wherein the particles are calcium carbonate particles.

17. The method of any one of claim 11, 12, 13, 14 or 15 wherein the fibers are as a bundle of fibers.

18. The method of any one of claim 11, 12, 13, 14 or 15 wherein the fibers are as a bundle of fibers and the particles are calcium carbonate.

19. The method of any one of claim 11, 12, 13, 14 or 15 wherein the composite is as a sheet molding composition with the fibers which are chopped in the polymer matrix.

20. A method of making a plurality of low resistivity graphite coated fillers comprising the steps of:
(a) providing a plurality of high resistivity fillers;
(b) providing a graphite solution comprising exfoliated and pulverized graphite particles having a particle size between about 0.1 and 500 microns in the solution;
(c) dipping the plurality of the fillers into the graphite solution; and
(d) drying the dipped fillers to provide the low resistivity graphite coated fillers.

21. A method of making a plurality of low resistivity graphite coated fillers comprising the steps of:
(a) providing a plurality of high resistivity fillers;
(b) providing a graphite solution comprising exfoliated and pulverized graphite particles having a particle size between about 0.1 and 500 microns in a solution;
(c) spraying the graphite solution onto the plurality of fillers for a time to provide sprayed fillers; and
(d) drying the sprayed fillers to provide the low resistivity graphite coated fillers.

22. A method of making a plurality of low resistivity graphite coated fillers comprising the steps of:
(a) providing a plurality of high resistivity fillers;
(b) providing a graphite solution comprising exfoliated and pulverized graphite particles having a particle size between about 0.1 and 500 microns mixed in a solution;
(c) coating the plurality of fillers with the graphite solution; and
(d) drying the fillers to provide the low resistivity graphite coated fillers.

23. A method of electrostatic painting a reinforced composite material without using a conductive primer comprising the steps of:
(a) providing a reinforced composite material which comprises a polymeric matrix; and a plurality of graphite coated fillers mixed in the polymeric matrix, each of the fillers comprising a high resistivity filler and having an outer surface, and exfoliated and pulverized graphite platelets having a particle size between about 0.1 and 500 microns coated on the outer surface of the filler to provide the coated filler;
(b) electrically grounding the reinforced composite material;
(c) providing a charged powder comprising a resin and a pigment;
(d) spraying the charged powder onto the electrically grounded reinforced composite material so as to coat the material; and
(e) curing the powder on the reinforced composite material in a curing oven, so as to electrostatically paint the reinforced composite material with the powder.

24. The method of claim 23 wherein the particles comprise calcium carbonate particles.

25. The method of claim 24 wherein the fibers comprise glass fibers.

26. The method of any one of claims 20 to 23 wherein the fillers comprise particles.

27. The method of claim 23 wherein the particles comprise calcium carbonate particles.

28. A reinforced composite material which comprises in admixture:
(a) polymeric matrix; and
(b) a plurality of graphite coated fillers mixed in the polymeric matrix, the filler having a high resistivity and having an outer surface, and exfoliated and pulverized platelets of the graphite having a particle size between about 0.1 and 500 microns coated on the outer surface of the filler, wherein the reinforced composite material enables electrostatic painting.

29. The reinforced composite material of claim 28, wherein the filler comprises glass fibers.

30. The reinforced composite material of claim 29, wherein the weight fraction of the platelets on the outer surface of the glass fibers is from about 0.01 wt % to about 15 wt % of the weight of the fibers.

31. The reinforced composite material of claim 28, wherein the filler comprises polymer fibers.

32. The reinforced composite material of claim 28, wherein the polymeric matrix comprises a thermoset or thermoplastic organic polymer.

33. The composite material of any one of claim 28, 29, 30, 31 or 32 wherein the filler is particles.

34. The composite material of any one of claim 28, 29, 30, 31 or 32 wherein the filler is fibers as a bundle of fibers.

35. The composite material of any one of claim 28, 29, 30, 31 or 32 wherein the filler is fibers as a bundle of fibers and particles.

36. The composite material of any one of claim 28, 29, 30, 31 or 32 wherein the composite is as a sheet molding composition wherein the filler is fibers which are in chopped form in the polymer matrix.

37. The composite material of any one of claim 28, 29, 30, 31 or 32 wherein the fibers are distributed throughout the polymer matrix.

38. The composite material of claim 28 wherein the exfoliated and pulverized platelets of the graphite are coated on the outer surface of the filler with a binder comprising at least one of poly(sodium 4-styrene sulfonate) (PSSS), poly (diallyldimethylammonium chloride) (PDAC), and poly(styrene-co-maleic anhydride) (PSMA).

39. The composite material of claim 38 wherein the filler comprises inorganic particles and the binder comprises poly(styrene-co-maleic anhydride).

40. The composite material of claim 39 wherein the filler comprises fibers and the binder comprises at least one of poly(sodium 4-styrene sulfonate) and poly(diallyldimethylammonium chloride).

41. The composite material of claim 28 wherein the reinforced composite material consists of:
(a) the polymeric matrix;
(b) the plurality of graphite coated, high resistivity fillers in the polymeric matrix;
(c) optionally one or more reinforcements in the polymeric matrix, the reinforcements being selected from the group consisting of uncoated high resistivity fillers, graphite, and combinations thereof; and
(d) optionally one or more additives in the polymeric matrix, the additives being selected from the group consisting of pigments, UV stabilizers, catalysts, inhibitors, thickeners, and combinations thereof;
wherein the reinforced composite material enables electrostatic painting.

42. The composite material of claim 41 wherein the graphite coated, high resistivity fillers comprise graphite coated, high resistivity fibers.

43. The composite material of claim 42 wherein the graphite coated, high resistivity fibers comprise graphite coated glass fibers.

44. The composite material of claim 42 wherein the graphite coated, high resistivity fibers comprise graphite coated polymer fibers.

45. The composite material of claim 41 wherein the graphite coated, high resistivity fillers comprise graphite coated, high resistivity inorganic particles.

46. The composite material of claim 45 wherein the graphite coated, high resistivity inorganic particles comprise graphite coated, high resistivity calcium carbonate particles.

47. The composite material of any one of claims 41 to 46 wherein the uncoated high resistivity filler reinforcements are present in the form of uncoated glass fibers.

48. The composite material of any one of claims 41 to 46 wherein the graphite reinforcements are present in the form of exfoliated and pulverized platelets of graphite.

49. The composite material of claim 41 wherein the exfoliated and pulverized platelets of the graphite are coated on the outer surface of the high resistivity filler with a binder selected from the group consisting of poly(sodium 4-styrene sulfonate) (PSSS), poly(diallyldimethylammonium chloride) (PDAC), poly(styrene-co-maleic anhydride) (PSMA), and combinations thereof.

* * * * *

UNITED STATES PATENT AND TRADEMARK OFFICE
CERTIFICATE OF CORRECTION

| | |
|---|---|
| PATENT NO. | : 8,017,228 B2 |
| APPLICATION NO. | : 11/897692 |
| DATED | : September 13, 2011 |
| INVENTOR(S) | : Lawrence T. Drzal et al. |

Page 1 of 1

It is certified that error appears in the above-identified patent and that said Letters Patent is hereby corrected as shown below:

Column 13, Line 39, "width=2000*n*D)" should be --width=2000*π*D)--.

Column 24, Line 9, Claim 24, "The method of claim 23 wherein the particles comprise calcium carbonate particles." should be --The method of any one of claims 20 to 23 wherein the fillers comprise fibers.--.

Column 24, Line 16, Claim 27, "The method of claim 23 wherein the particles comprise calcium carbonate particles." should be --The method of claim 26 wherein the particles comprise calcium carbonate particles.--.

Signed and Sealed this
Fourth Day of December, 2012

David J. Kappos
*Director of the United States Patent and Trademark Office*